US010942800B2

(12) United States Patent
Yun et al.

(10) Patent No.: US 10,942,800 B2
(45) Date of Patent: Mar. 9, 2021

(54) STORAGE DEVICE, COMPUTING SYSTEM AND DEBUGGING METHOD THEREOF

(71) Applicant: SAMSUNG ELECTRONICS CO., LTD., Suwon-si (KR)

(72) Inventors: Dukyoung Yun, Hwaseong-si (KR); Chul-Woo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 16/139,983

(22) Filed: Sep. 24, 2018

(65) Prior Publication Data

US 2019/0114218 A1    Apr. 18, 2019

(30) Foreign Application Priority Data

Oct. 12, 2017  (KR) .................. 10-2017-0132780

(51) Int. Cl.
*G06F 11/00* (2006.01)
*G06F 11/07* (2006.01)
*G06F 11/34* (2006.01)

(52) U.S. Cl.
CPC ........ *G06F 11/0778* (2013.01); *G06F 11/008* (2013.01); *G06F 11/0727* (2013.01); *G06F 11/0784* (2013.01); *G06F 11/0787* (2013.01); *G06F 11/3476* (2013.01)

(58) Field of Classification Search
CPC ............... G06F 11/0778; G06F 11/008; G06F 11/0727; G06F 11/0784; G06F 11/0787; G06F 11/3476
See application file for complete search history.

(56) References Cited

U.S. PATENT DOCUMENTS

| 6,633,876 | B1 | 10/2003 | Heatlie |
| 6,681,348 | B1 | 1/2004 | Vachon |
| 7,679,133 | B2 | 3/2010 | Son et al. |
| 8,028,120 | B2 | 9/2011 | Mo et al. |
| 8,553,466 | B2 | 10/2013 | Han et al. |
| 8,559,235 | B2 | 10/2013 | Yoon et al. |
| 8,630,124 | B2 | 1/2014 | Kim et al. |
| 8,654,587 | B2 | 2/2014 | Yoon et al. |
| 8,730,913 | B2 | 5/2014 | Anderson et al. |
| 8,831,075 | B1 | 9/2014 | Yuan et al. |
| 9,563,260 | B2 | 2/2017 | Wagh et al. |
| 2011/0041005 | A1 | 2/2011 | Selinger |
| 2011/0233648 | A1 | 9/2011 | Seol et al. |

(Continued)

FOREIGN PATENT DOCUMENTS

| KR | 101212809 B1 | 12/2012 |
| KR | 101295413 B1 | 8/2013 |

(Continued)

*Primary Examiner* — Katherine Lin
(74) *Attorney, Agent, or Firm* — Volentine, Whitt & Francos, PLLC

(57) ABSTRACT

A storage device which generates dump data for debugging at the occurrence of an error includes a memory device including a dump area for storing the dump data, and a storage controller that receives a dump request from a host through a first host interface, stores the dump data in the dump area in response to the dump request, and transmits the stored dump data to the host by using a second host interface after resetting the second host interface.

18 Claims, 14 Drawing Sheets

(56) References Cited

U.S. PATENT DOCUMENTS

2016/0378579 A1* 12/2016 Zhao .................. G06F 11/0751
                                                          714/37
2018/0011524 A1*  1/2018 Stumpf .................... G06F 1/28
2018/0059752 A1*  3/2018 Khatri ...................... G06F 1/28
2018/0188322 A1*  7/2018 Rogel-Favila ... G01R 31/31703

FOREIGN PATENT DOCUMENTS

| KR | 1020170059818 A | 5/2017 |
|----|-----------------|--------|
| KR | 101751876 B1    | 6/2017 |

* cited by examiner

STORAGE DEVICE, COMPUTING SYSTEM AND DEBUGGING METHOD THEREOF

CROSS-REFERENCE TO RELATED APPLICATIONS

A claim for priority under 35 U.S.C. § 119 is made to Korean Patent Application No. 10-2017-0132780 filed on Oct. 12, 2017, in the Korean Intellectual Property Office, the disclosure of which is incorporated herein by reference in its entirety.

BACKGROUND

The inventive concepts described herein relate to a semiconductor memory device, and more particularly relate to a storage device, a computing system, and a debugging method thereof.

Flash memory devices are widely used as voice and image data storage media of information devices such as computers, smartphones, personal digital assistants (PDAs), digital cameras, voice recorders, MP3 players, handheld PCs, and the like. However, since an erase operation is necessarily performed prior to writing data in a flash memory, a unit of data of the flash memory to be erased may be greater than a unit of data to be written to the flash memory. This makes it difficult to utilize a file system for a general hard disk even in the case where the flash memory is used as an auxiliary storage device. Also, because of such characteristics, sequential input/output processing associated with the flash memory is more efficient than non-sequential input/output processing.

A typical example of a flash memory-based high-capacity storage device is a solid state drive (hereinafter referred to as an "SSD"). As the use of SSDs and the type of devices in which they are utilized has become more diversified, the demands on SSDs have consequently increased. For example, SSDs may be used as storage devices for servers, clients, data centers, and the like. Maintenance of SSDs in the above-described applications may be used to provide high reliability and optimized quality of service.

However, an unexpected failure or error may occur due to hardware or software problems during operation of SSDs in the above-described applications. In such an event, an SSD may collect a device state at a time when the error or failure occurred, and store the collected device state as dump data. The collected dump data may be transmitted to a host to which the SSD is connected. The dump data transmitted to the host may be provided to and used by a debugging tool or debugging equipment, and dump data-based debugging may be performed.

However, as the capacity and complexity of SSDs have increased, the size of the dump data has consequently increased. In particular, there is a need to collect and extract larger sized dump data as quickly and efficiently as possible for detailed failure analysis. In this case, the speed of transmission of dump data to a debugging channel provided for failure analysis of the SSD is limited, and as a result rapid analysis is difficult. For this reason, it is difficult to obtain real-time state information at the occurrence of error/failure for the purpose of exactly debugging the SSD.

SUMMARY

Embodiments of the inventive concepts provide a storage device which is capable of improving precision of debugging through minimization of loss of dump data or log information at occurrence of a problem, a computing system including the same, and a debugging method thereof.

Embodiments of the inventive concepts provide a storage device including a memory device including a dump area for storing dump data, and a storage controller that receives a dump request from a host through a first host interface at an occurrence of an error, generates the dump data including state information of the storage device for debugging, responsive to the dump request, stores the dump data in the dump area, and transmits the stored dump data to the host using a second host interface after resetting the second host interface.

Embodiments of the inventive concepts further provide a debugging method of a storage device which communicates with a host through a side-band interface and an in-band interface. The debugging method includes receiving, by the storage device, a dump request from the host through the side-band interface at an occurrence of an error; generating, by the storage device, dump data including state information of the storage device for debugging in response to the dump request; storing, by the storage device, the dump data in a memory device; receiving, by the storage device, a reset request for resetting the in-band interface from the host; resetting, by the storage device, the in-band interface responsive to the reset request; and, after the in-band interface is completely reset, transmitting, by the storage device, the stored dump data to the host through the in-band interface.

Embodiments of the inventive concepts still further provide a computing system including a storage device and a host. The storage device includes a first host interface and a second host interface. The storage device collects dump data including state information of the storage device for debugging, and stores the dump data in response to a dump request at an occurrence of an error. The host transmits the dump request to the storage device using the first host interface, and reads the stored dump data using the second host interface, after the second host interface is reset responsive to a reset request for the second host interface.

Embodiments of the inventive concepts also provide a storage device including a first interface and a second interface; a memory including a dump area; and a storage controller. The storage controller is configured to detect an error in the storage device and transmit an error report to a host through the first interface; generate dump data responsive to a dump request from the host received through the first interface after the error report is transmitted, and store the dump data including state information of the storage device in the dump area; transmit a notification to the host after the dump data is stored in the dump area; reset the second interface responsive to a reset request received from the host through the second interface after the notification is transmitted; and after resetting the second interface, transmit the stored dump data to the host through the second interface responsive to a dump data request received from the host through the second interface.

BRIEF DESCRIPTION OF THE FIGURES

The above and other objects and features of the inventive concepts will become apparent from the following detailed made with reference to the accompanying drawings.

DETAILED DESCRIPTION

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Hereinafter, as an example of a storage device, a solid state drive using flash memory device(s) will be exemplified to describe features and functions of the inventive concepts. However, one skilled in the art may easily understand other merits and performance of the inventive concepts depending on the contents disclosed herein. The inventive concepts may be implemented or applied through other embodiments. In addition, the detailed description may be changed or modified according to view points and applications without departing from the claims, the scope and spirit, and any other purposes of the inventive concepts.

Figure 1:
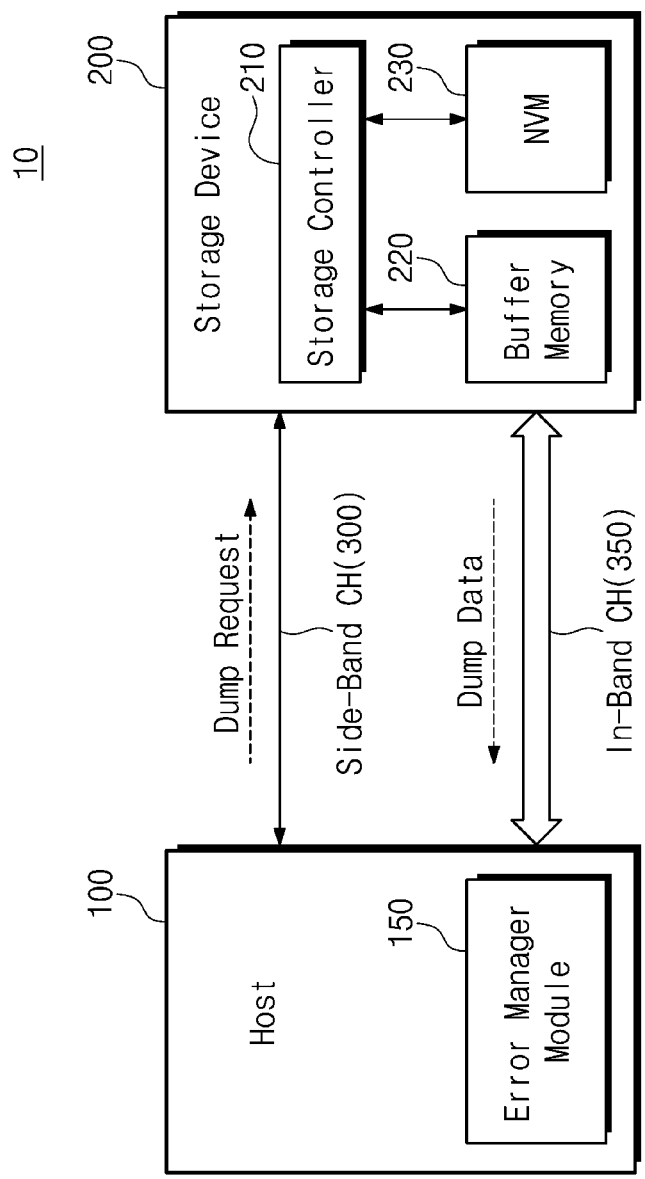
FIG. 1 illustrates a block diagram of a storage device, and a computing system including the storage device, according to an embodiment of the inventive concepts.

FIG. 1 illustrates a block diagram of a computing system including a storage device according to an embodiment of the inventive concepts. Referring to FIG. 1, a computing system 10 of the inventive concepts includes a host 100 and a storage device 200.

The host 100 writes data in the storage device 200 or reads data stored in the storage device 200. The host 100 may generate an instruction for writing data in the storage device 200 or reading data stored in the storage device 200. The host 100 may be for example a personal computer or a server. For example, the host 100 may search for data stored in the storage device 200 in response to a request from a client and may provide the found result to the client.

The host 100 includes an error manager module 150 for detecting a failure or an error of the storage device 200 and extracting dump data. The error manager module 150 may monitor an error event at the storage device 200. If (when) an error event occurs, the error manager module 150 requests the storage device 200 to collect and store dump data for debugging. The request is made through a side-band channel 300. If (when) the dump data is completely stored in the storage device 200, the error manager module 150 may request the storage device 200 to reset an in-band channel 350. For example, the error manager module 150 may request the storage device 200 to reset an in-band interface of the storage device 200 as will be subsequently described, thus resetting the in-band channel 350. If (when) the in-band channel 350 is completely reset, the error manager module 150 may receive dump data stored in the storage device 200 through the in-band channel 350.

The storage device 200 may provide data that the host 100 requests, or may store data write requested by the host 100. In particular, if (when) various errors or problems occur, the storage device 200 generates dump data including state information of the storage device 200 of (i.e., corresponding to) an error-occurring time point, and stores the dump data in a buffer memory 220 or a nonvolatile memory device 230. The dump data includes an error or failure context. The storage device 200 may transmit dump data stored in the buffer memory 220 or the nonvolatile memory device 230 to the host 100. In particular, when an error occurs, the storage device 200 receives a dump request for dump data for debugging (i.e., debugging dump data) through the side-band channel 300 from the host 100. The storage device 200 stores dump data for preserving a state of the storage device 200 of or corresponding to a point in time when the error occurred, in response to the dump request. If (when) the dump data are completely stored, the storage device 200 resets a storage controller 210 and transmits information indicating that the dump data are completely stored, to the host 100 through the side-band channel 300. Afterwards, resetting and initialization of an in-band channel 350 may be performed by the host 100. If the resetting and initialization of an in-band channel 350 is completed, the storage device 200 transmits the stored dump data through the in-band channel 350 in response to a request of the host 100.

To transmit the dump data, the storage device 200 may include the storage controller 210, the buffer memory 220, and the nonvolatile memory device 230. Data provided according to a write request of the host 100 may be programmed in the nonvolatile memory device 230 through the buffer memory 220. If (when) a read request of the host 100 is generated, data existing in the nonvolatile memory device 230 or the buffer memory 220 may be provided to the host 100. The storage controller 210 may control the buffer memory 220 and the nonvolatile memory device 230 in response to the request of the host 100. The buffer memory 220 may be implemented with, for example, dynamic random access memory (DRAM).

When an error occurs, the storage controller 210 collects dump data for analyzing the error and stores the collected dump data in the buffer memory 220 or the nonvolatile memory device 230. If (when) the dump data are completely stored, the storage controller 210 may perform a reset of the storage controller 210. In this case, the reset of the storage controller 210 may progress to a reset level of a power cycle. For example, the storage controller 210 may be reset to a reset level of a power cycle. Accordingly, various errors that are able to occur in the storage controller 210 may be initialized by the reset. In some embodiments, after dump data are stored, the reset of the storage controller 210 may be omitted.

The storage controller 210 notifies the host 100 that dump data are completely stored, after the reset. If (when) receiving a reset request for a physical layer of the in-band channel 350 from the host 100, the storage controller 210 resets an interface for using the in-band channel 350. If (when) the host 100 requests the storage controller 210 to transmit dump data, the storage controller 210 may transmit dump data stored in the buffer memory 220 or the nonvolatile memory device 230 through the in-band channel 350. A debugging device may analyze an error that occurred in the storage device 200 by using the dump data transmitted to the host 100.

According to the above-described configuration and function of the storage device 200 of the inventive concepts, the dump request for dump data for debugging may be provided through the low-speed side-band channel 300. After dump data are completely stored, the dump data may be transmitted to the host 100 at high speed after resetting of an interface for using the in-band channel 350.

Figure 2:
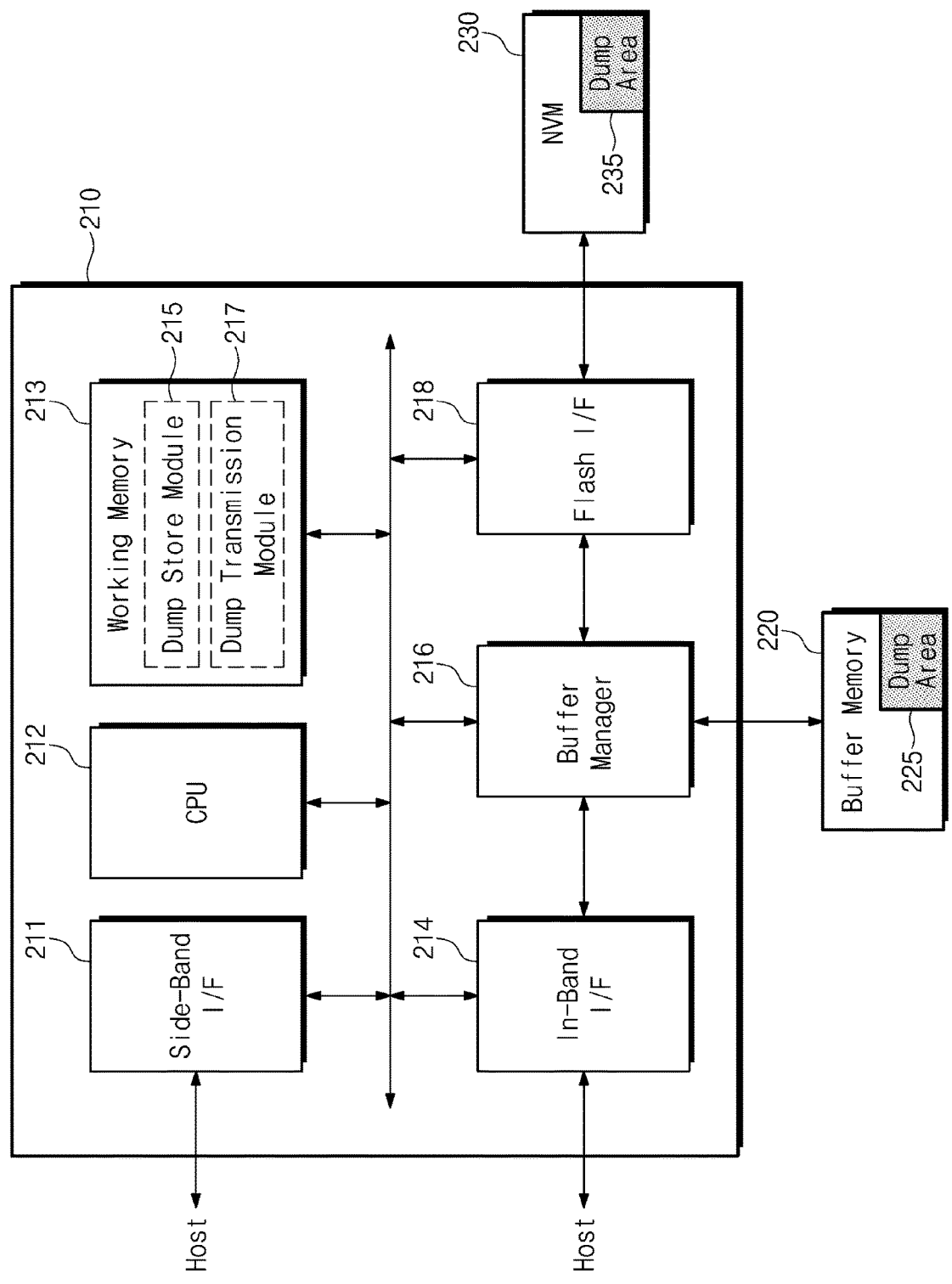
FIG. 2 illustrates a block diagram of a configuration of the storage device of FIG. 1.

FIG. 2 illustrates a block diagram of a configuration of a storage device of FIG. 1. Referring to FIG. 2, the storage device 200 includes the storage controller 210, the buffer memory 220, and the nonvolatile memory device 230.

The storage controller 210 includes a side-band interface 211, a central processing unit 212, a working memory 213, an in-band interface 214, a buffer manager 216, and a flash interface 218. The side-band interface 211 and the in-band interface 214 may constitute a host interface.

The side-band interface 211 may provide interfacing between the storage controller 210 and the host 100. The side-band interface 211 may be, for example, an I²C interface that includes one serial data line SDA and one serial clock line SCL and supports bidirectional communication. In the protocol for the I²C interface, a communication target may be determined by specifying, at a bus master, a unique address of the communication target. The side-band interface 212 as an I²C interface may use a bidirectional open collector line of a serial data line SDA and a serial clock line SCL to which pull-up resistors are respectively connected.

However, it may be understood that the side-band interface 211 may be replaced with or configured according to any of various protocols such as for example system management bus (SMBus), universal asynchronous receiver transmitter (UART), serial peripheral interface (SPI), high-speed inter-chip (HSIC), and the like. The side-band interface 211 may enable data communication (e.g., transmission and reception) with any device that the bus master specifies. Also, since the mechanism for evading bus competition is defined by the protocol for the side-band interface 211, a randomly specified device may operate as a master.

The central processing unit 212 may be characterized as a control circuit, and may provide a variety of control information, which is needed to perform read and write operations on the nonvolatile memory device 230, to registers of the side-band interface 211, the in-band interface 214, and the flash interface 218. The central processing unit 212 may operate depending on firmware provided for various control operations of the storage controller 210. For example, the central processing unit 212 may execute garbage collection for managing the nonvolatile memory device 230 or a flash translation layer (FTL) for performing address managing, wear leveling, and the like.

The central processing unit 212 may execute a dump store module 215 and a dump transmission module 217 provided in the working memory 213 or a read only memory (ROM). The dump store module 215 as executed by the central processing unit 212 stores (e.g., in the buffer memory 220 or the nonvolatile memory device 230) dump data for storing a state of the storage device 200 of or corresponding to a point in time when an error or failure occurs, in response to the dump request from the host 100. The dump data includes data that would be lost when the reset process is performed, and data that would not be lost (i.e., data that would be maintained) when the reset process is performed. The dump store module 215 may first store data capable of being lost by the reset in the buffer memory 220 or the nonvolatile memory device 230.

The central processing unit 212 may reset the in-band interface 214 as the dump transmission module 217 is driven (executed). After the reset, the central processing unit 212 transmits the dump data stored in the buffer memory 220 or the nonvolatile memory device 230 to the host 100 through the in-band interface 214 by using the dump transmission module 217.

The working memory 213 may be used as an operation memory, a cache memory, or a buffer memory of the central processing unit 212. The working memory 213 may store codes or commands that the central processing unit 212 executes. The working memory 213 may store data processed by the central processing unit 212. In an embodiment, the working memory 213 may be implemented with static RAM (SRAM). In particular, the dump store module 215 used by the central processing unit 212 to extract and store dump data at occurrence of an error or failure event, and the dump transmission module 217 used by the central processing unit 212 to transmit the stored dump data, are loaded on the working memory 213. The dump store module 215 and the dump transmission module 217 may be executed by the central processing unit 212 and may control operations of storing dump data and transmitting the dump data to the host 100. In addition, the flash translation layer FTL or various memory management modules may be stored in the working memory 213. Here, a description will be given under assumption that the dump store module 215 and/or the dump transmission module 217 are implemented by software. However, it should be understood that in other embodiments of the inventive concepts, the dump store module 215 and/or the dump transmission module 217 may be implemented with hardware such as an intellectual property (IP) block.

The in-band interface 214 provides a main channel for exchanging data with the host 100. The side-band interface 211 provides a channel for management and error control, and the in-band interface 214 provides a high-speed data transmission channel. The in-band interface 214 may be configured according to any of various communication protocols such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), a registered DIMM (RDIMM), load reduced DIMM (LRDIMM), and the like.

The buffer manager 216 controls read and write operations of the buffer memory 220. For example, the buffer manager 216 temporarily stores write data or read data in the buffer memory 220. In addition, the buffer manager 216 may store dump data in a dump area 225 of the buffer memory 220 under control of the central processing unit 212.

The flash interface 218 exchanges data with the nonvolatile memory device 230. The flash interface 218 writes data transmitted from the buffer memory 220 at the nonvolatile memory device 230. The flash interface 218 may transmit read data from the nonvolatile memory device 230 to the buffer memory 220 or the host 100. In particular, the flash interface 218 may store or read dump data in or from a dump area 235 of the nonvolatile memory device 230 under control of the central processing unit 212.

The buffer memory 220 is used as an input/output buffer of the storage device 200. In addition, the buffer memory 220 may store dump data of the storage device 200. In the case where an error arises from the storage device 200, the storage controller 210 may extract dump data and may write the dump data in the dump area 225 of the buffer memory 220. Also, the buffer memory 220 may store an operation state of the storage device 200 or a variety of monitored information.

The nonvolatile memory device 230 is a storage medium where data write-requested by the host 100 is ultimately stored. The nonvolatile memory device 230 is connected with the flash interface 218 of the storage device 200. The nonvolatile memory device 230 may also include the dump area 235 for storing dump data. For example, in the case where the buffer memory 220 is included as a target of a reset operation to be performed by the dump store module 215 after extraction of the dump data, the dump data may be preferably stored in the nonvolatile memory device 230. However, even though the buffer memory 220 is not included as the target of the reset operation to be performed by the dump store module 215, the dump area 235 for storing dump data may be included in the nonvolatile memory device 230.

The nonvolatile memory device 230 may include, for example, one or more flash memories. In an embodiment, the nonvolatile memory device 230 may be implemented with nonvolatile memory cells such as electrically erasable and programmable ROM (EEPROM) cells, NAND flash memory cells, NOR flash memory cells, phase-change RAM (PRAM) cells, resistive RAM (ReRAM) cells, ferroelectric RAM (FRAM) cells, spin-torque magnetic RAM (STT-MRAM) cells, and the like. For convenience of description, it may be assumed that the nonvolatile memory device is a NAND flash memory.

For example, as an exemplary embodiment according of the inventive concept, the nonvolatile memory device 230 may include a three-dimensional memory array. The 3-dimensional memory array may be monolithically formed in one or more physical level(s) of a memory cell array having an active area arranged as part of a circuit on a silicon substrate, and the circuit may control operation of memory cells. The circuit related to operation of the memory cells may be located in the substrate or on the substrate. The term "monolithic" means that layers of each level of the array are directly deposited on the layers of each underlying level of the array.

As an exemplary embodiment of the inventive concepts, the 3-dimensional memory array may have a vertical-directional characteristic, and may include vertical NAND strings in which at least one memory cell is located on another memory cell. The at least one memory cell may include a charge trap layer. Each vertical NAND string may include at least one selection transistor located over memory cells. The at least one selection transistor may have the same structure as those of memory cells and may be monolithically formed together with memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

According to the above-described structure, the storage device 200 receives a dump request through the side-band interface 211 operating at low speed and stores dump data in the buffer memory 220 or the nonvolatile memory device 230. Afterwards, the storage device 200 transmits the stored dump data to the host 100 through the in-band interface 214, after the in-band interface 214 is reset. Accordingly, even though the error or failure may have arisen from or occurred due to the in-band interface 214, the storage device 200 of the inventive concepts is still able to store dump data to which a failure state is applied. Also, since the stored dump data are transmitted through the high-speed in-band interface 214, it is possible to quickly transmit a significant amount of dump data to the host 100.

Figure 3:
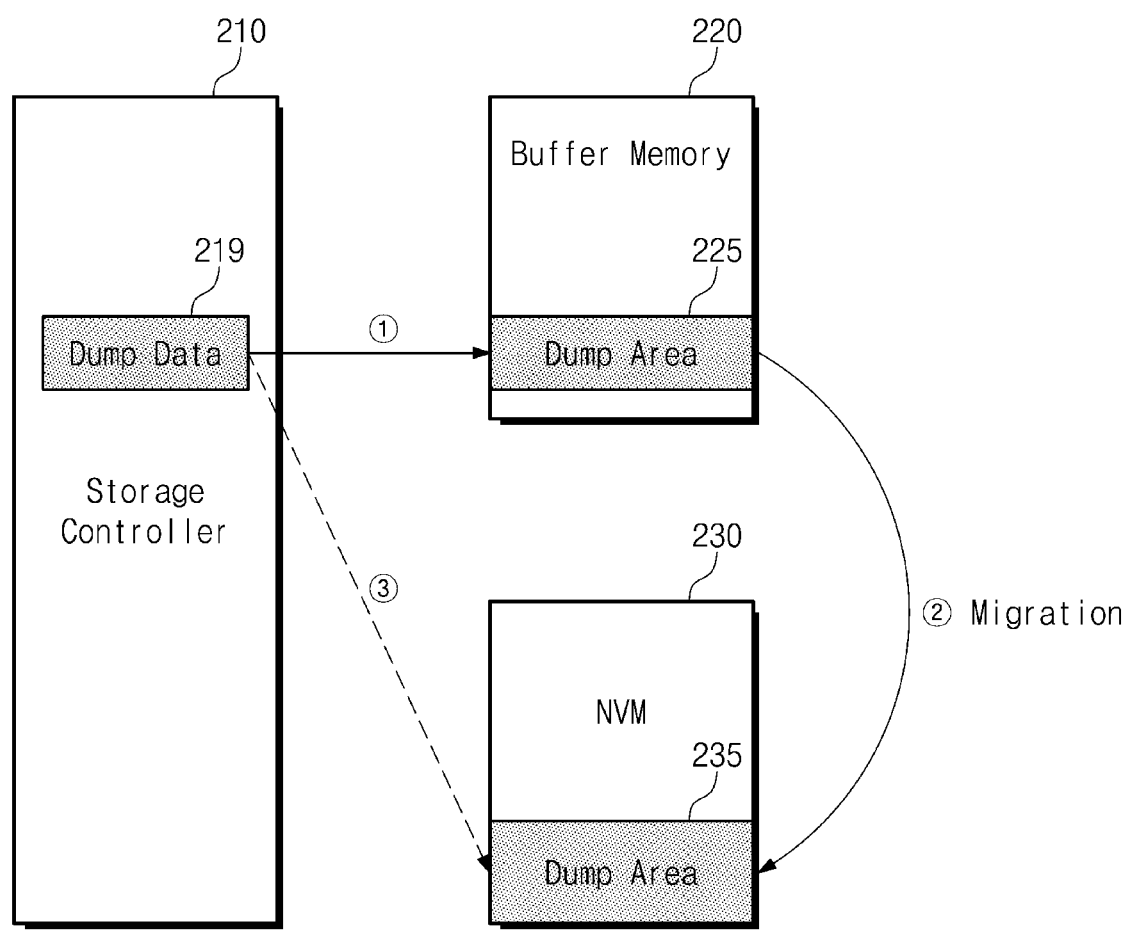
FIG. 3 illustrates a block diagram of a process of storing dump data of a storage device of an embodiment of the inventive concepts.

FIG. 3 illustrates a block diagram of a process of storing dump data of a storage device of the inventive concepts. Referring to FIG. 3, the storage device 200 extracts dump data in response to the dump request of the host 100 and stores the extracted dump data in the buffer memory 220 or the nonvolatile memory device 230.

The storage controller 210 collects dump data 219 in response to the dump request received through the side-band interface 211. The failure or error resulting in transmission of the request for dump data may be for example a hardware problem, a processing error of software, or a response delay error of an interface (e.g., an in-band interface) arising or occurring at the storage device 200. The host 100 may detect the error or problem, or the storage device 200 may detect the error or problem and report an error event to the host 100. The host 100 transmits the dump request to the storage controller 210 by using the side-band interface 211.

The storage controller 210 generates or creates dump data including overall storage states of (or corresponding to) a point in time when the error or problem occurs, in response to the dump request. The dump data thus generated may be written in the dump area 225 of the buffer memory 220. Reference numeral ① in FIG. 3 indicates an operation of writing dump data in the dump area 225 of the buffer memory 220. It should be understood that the dump data may be generated or created in various different ways, and that detailed description of the manner in which the dump data is generated or created at an error-occurring time point is therefore omitted.

The dump data 219 stored in the dump area 225 of the buffer memory 220 may migrate to the dump area 235 of the nonvolatile memory device 230. Reference numeral ② in FIG. 3 indicates migration of the dump data 219 to the dump area 235. In the case where the buffer memory 220 is reset after the dump data 219 is completely stored, the dump data stored in the buffer memory 220 may be lost. Accordingly, the dump data 219 may be stored in the dump area 235 of the nonvolatile memory device 230 for the purpose of stably maintaining dump data even upon resetting the buffer memory 220.

The dump data 219 may be stored without using the buffer memory 220. For example, if the nonvolatile memory device 230 provides high-speed write performance, the dump data 219 may be directly written from the storage controller 210 to the dump area 235 of the nonvolatile memory device 230. Reference numeral ③ indicates the write operation of the dump data 219 directly in nonvolatile memory device 230.

The manner in which the dump data is stored in the storage device 200 in response to the dump request is described above. However, a location where the dump data 219 is stored may vary depending on a reset operation to be performed after the dump data is stored. In the case where the buffer memory 220 is excluded as a reset target in the reset operation, migration of the dump data 219 to the nonvolatile memory device 230 is unnecessary. However, in the case where the buffer memory 220 is included as the reset target, the dump data 219 may migrate and be stored in the nonvolatile memory device 230.

Figure 4:
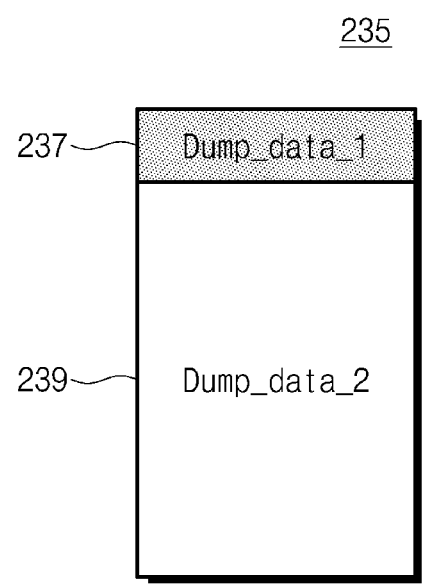
FIG. 4 illustrates a block diagram of an area in which dump data are stored.

FIG. 4 illustrates a view of an area in which dump data of the inventive concepts are stored. Referring to FIG. 4, there is illustrated a configuration of the dump area 235 of the nonvolatile memory device 230. Here, the dump area 225 of the buffer memory 220 may be divided according to attributes of dump data in the same manner as the dump area 235 of the nonvolatile memory device 230.

First, first dump data Dump_data_1 capable of being lost in a reset process may be stored in a first dump area 237. Upon receiving the dump request, the dump store module 215 as executed by the central processing unit 212 may store a first error or failure, or state information, management data, user data, etc. of the storage device 200 of or corresponding to a point in time when a defect is detected. The pieces of data may include data that would be changed in the reset operation to be performed after dump data are completely stored. For example, in the case where an error occurs in transmitting data through the in-band interface 214, commands or state information loaded on registers of the in-band interface 214 may be lost after the in-band interface 214 is reset. The dump store module 215 regards such data as the first dump data Dump_data_1 and stores such data in the first dump area 237. The first dump data Dump_data_1 may include, for example, a context, a firmware context for data transmission, and a command history of the in-band interface 214. The dump store module 215 may store snapshot data, which are generated by dumping the first dump data Dump_data_1, in the first dump area 237.

In contrast, second dump data Dump_data_2 that are not lost or changed by a reset operation to be performed after storing of the dump data may be stored in a second dump area 239. For example, metadata, which are updated in the storage device 200, such as address mapping information or user data may maintain the same value before or after the in-band interface 214 is reset. The second dump data Dump_data_2 may be transmitted to the host 100 after being stored in the second dump area 239. The second dump data Dump_data_2 may be transmitted to the host 100 from a location where the second dump data Dump_data_2 are stored, without a separate dump operation.

When an error or failure occurs, both the first dump data and the second dump data are substantially required to analyze overall states of the storage device 200. However, the size of dump data needed to exactly analyze an error or failure cannot be substantially large. A significantly long time (e.g., several hours or days) may be taken to provide a large amount of dump data to the host 100 through the side-band channel 300. However, according to an embodiment of the inventive concepts, since a large amount of dump data are transmitted at high speed, rapid failure analysis is possible.

Figure 5:
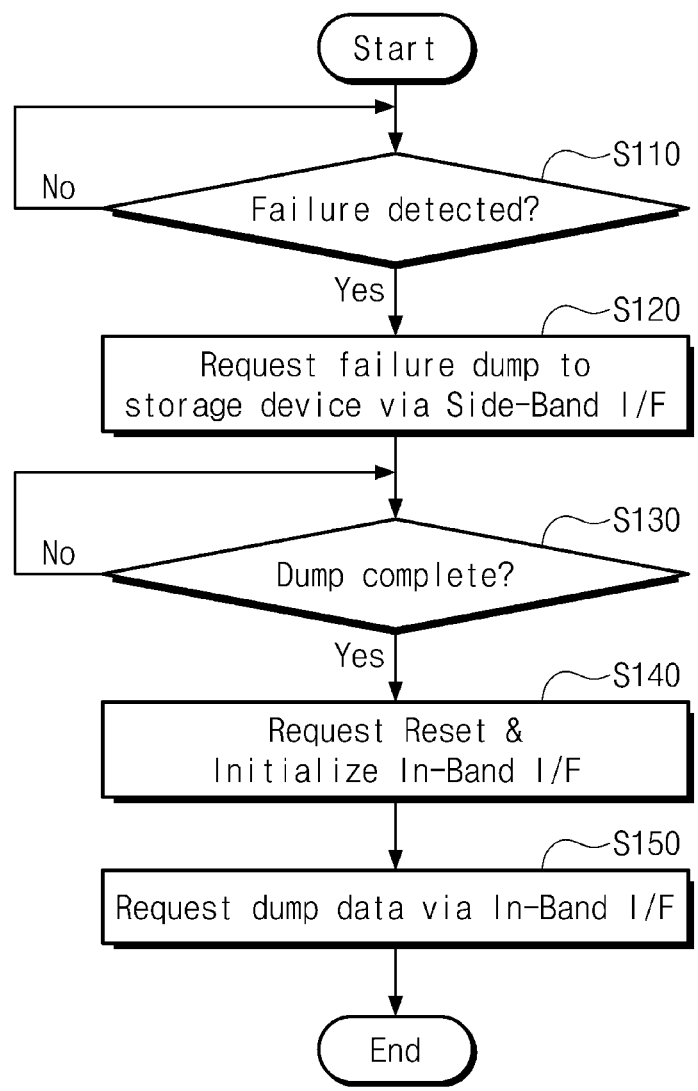
FIG. 5 illustrates a flowchart of an operation of a host according to an embodiment of the inventive concepts.

FIG. 5 illustrates a flowchart of an operation of the host 100 according to an embodiment of the inventive concepts. Referring to FIG. 5, if an error or failure is detected during communication with the storage device 200, the host 100 sends the dump request to side-band channel 300 and is provided with stored dump data through the in-band channel 350.

In operation S110, the host 100 detects the error or failure of the storage device 200. For example, the host 100 may detect an error from data provided from the storage device 200, or may recognize an error or failure through an error report of the storage device 200. The storage device 200 may detect the error or failure and may report the detection result to the host 100. Alternatively, the host 100 may provide the storage device 200 with a state confirm command such as an asynchronous event request. The host 100 may determine a problem of the storage device 200 or a problem in communication through an error or failure report of the storage device 200 or automatic detection. If an error or failure is not detected in operation S110 (No), the procedure proceeds to (i.e., remains in) operation S110 to continuously monitor an error or failure. However, if an error or failure is detected in operation S110 (Yes), the procedure proceeds to operation S120.

In operation S120, the host 100 requests the storage device 200 to extract and store dump data or a failure context for preserving a state of the storage device 200 of or corresponding to a point in time when the error or failure occurs. That is, the host 100 transmits the dump request for dump data (i.e., a failure dump) to the storage device 200 through the side-band channel 300. In this case, the storage device 200 extracts the state of the storage device 200 of or corresponding to a point in time when an error or failure of each component including the in-band interface 214 or firmware occurs, and generates or creates dump data based on the extracted state. The dump data thus generated or created are stored in the dump area 225 or the dump area 235. Selectively, the storage device 200 may perform a reset operation on some or all components of the storage device 200. If the reset operation is completed, the storage device 200 notifies the host 100 that the dump data are completely stored.

In operation S130, the host 100 determines whether it is reported that the dump data are completely stored. If a report indicating that the dump data are completely stored is not received from the storage device 200 (No), the host 100 repeats operation S130 and waits until a complete report is received. In contrast, if in operation S130 a report indicating that the dump data are completely stored is received from the storage device 200 (Yes), the procedure proceeds to operation S140.

In operation S140, the host 100 transmits to the storage device 200 a reset and initialization request associated with the in-band interface 214 of the storage device 200 in response to a dump store complete report from the storage device 200. In the case where an error or failure is present in the in-band interface 214, the in-band interface 214 may be first reset to receive dump data at high speed. A reset or initialization command may be provided from the host 100 for the in-band interface 214 to return to an available state (i.e., it is available for transmission). In this case, it should be understood that the reset or initialization command is provided through a control signal such as a reset signal as well as a command sequence. If (when) the in-band interface 214 is completely reset, the host 100 is provided with a reset complete report of the in-band interface 214 from the storage device 200.

In operation S150, the host 100 recognizes that the in-band interface 214 has returned to an available state, based on the reset complete report of the in-band interface 214. Also, the host 100 requests that the stored dump data be transmitted to the host 100 using the in-band interface 214. In this case, the dump data may be requested by using a general read command and the dump data is transmitted using the in-band interface 214. Even though the size of dump data is large, since the dump data are provided through the high-speed in-band interface 214, it is possible to quickly obtain the dump data.

According to the above description, when an error arises from the storage device 200, the host 100 transmits the dump request to the storage device 200 by using the side-band interface 211. Also, the host 100 resets the in-band interface 214 and is provided with the stored dump data through the reset in-band interface 214. Through the above-described procedure, the host 100 may be provided with dump data including error information at high speed even when an error or failure arises from the in-band interface 214.

Figure 6:
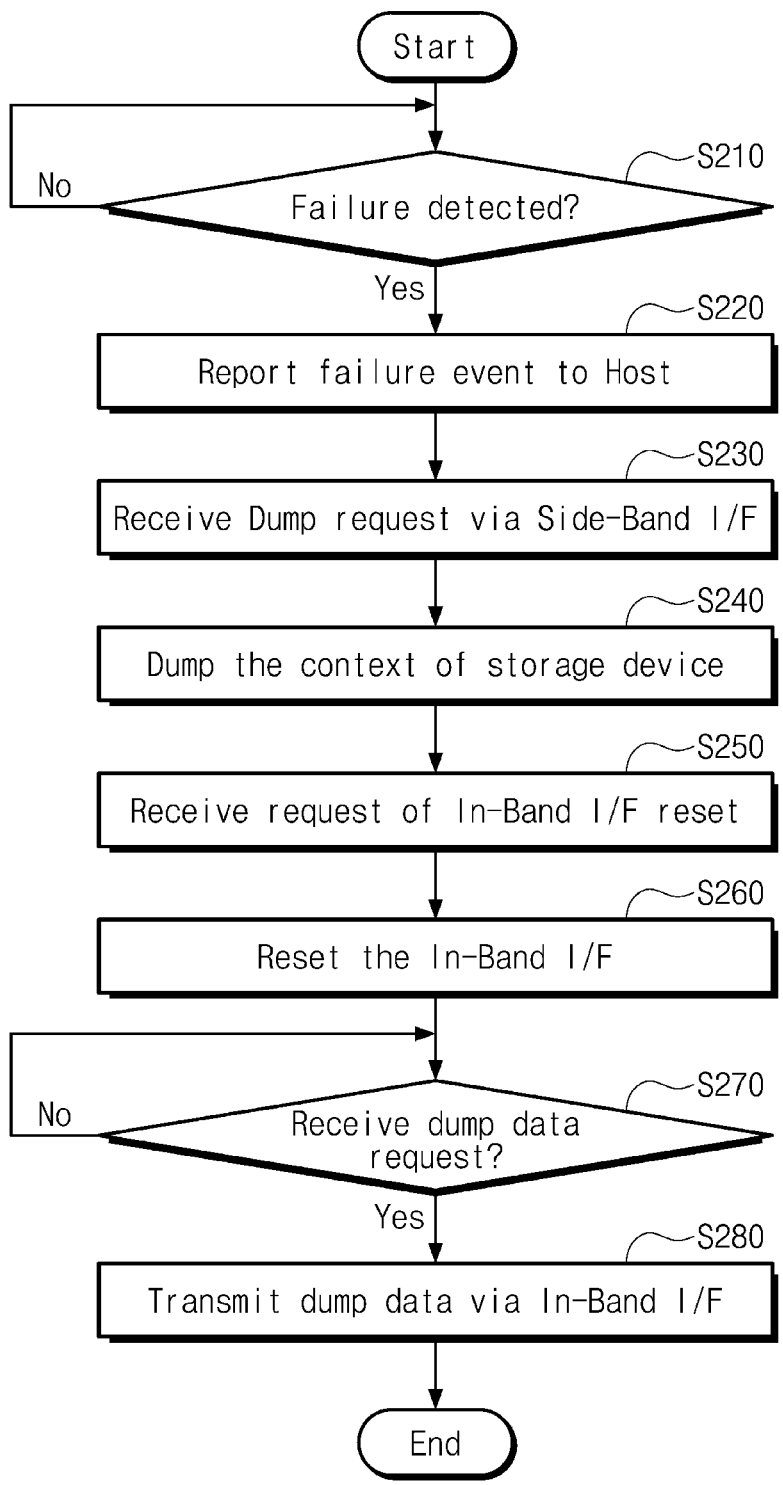
FIG. 6 illustrates a flowchart of a dump data management method of the storage device according to an embodiment of the inventive concepts.

FIG. 6 illustrates a flowchart of a dump data management method of a storage device according to an embodiment of the inventive concepts. Referring to FIG. 6, the storage device 200 receives the dump request through the side-band interface 211 and transmits dump data to the host 100 through the in-band interface 214.

In step S210, the storage device 200 detects whether an error or failure has occurred. For example, the storage device 200 may detect an error or failure occurring in an internal memory management operation or in a command of the host 100. In addition, the storage device 200 may detect various hardware failures including a power failure as well as a software error. If the error is not detected in operation S210 (No), the procedure returns to operation S210 and the storage device 200 continues to monitor an error. If the error is detected in operation S210 (Yes), the procedure proceeds to operation S220.

In operation S220, the storage device 200 reports a failure event to the host 100 through the side-band interface 211. The storage device 200 may report the occurrence of failure to the host 100 in response to a failure event report request from the host 100 or depending on an internal failure report manner. The host 100 transmits the dump request to the storage device 200 in response to the failure report.

In operation S230, the storage device 200 receives the dump request from the host 100, which is transmitted through the side-band interface 211.

In operation S240, the dump store module 215 (refer to FIG. 2) as executed by the central processing unit 212 generates dump data in response to the dump request transmitted through the side-band interface 211. The storage device 200 may collect overall data directing an operation state of the storage device 200 of or corresponding to a point in time when the failure occurs, in response to the dump request. In particular, the storage device 200 may collect state information of firmware for processing a command from the host 100 or register information of the interfaces 211, 214, and 218, and may store the collected information as dump data. The register information of the interfaces 211, 214, and 218 refers to data capable of being lost in a reset operation to be performed later. Accordingly, such data may be the first of all the data extracted upon generating the dump data. In addition, the storage device 200 may include pieces of data not lost in the reset process in the dump data. For example, the storage device 200 may include various kinds of user data or metadata such as address mapping information in the dump data. The dump data may be stored in the dump area 225 of the buffer memory 220 or the dump area 235 of the nonvolatile memory device 230.

In operation S250, the storage device 200 receives a reset request for the in-band interface 214 from the host 100. For example, the reset request for the in-band interface 214 provided from the host 100 may be detected by the dump transmission module 217 (refer to FIG. 2) as executed by the central processing unit 212. The reset request for the in-band interface 214 may be transmitted through the in-band interface 214.

In operation S260, the storage device 200 resets the in-band interface 214 depending on the reset request transmitted from the host 100. After the reset operation is performed, setting parameters of the in-band interface 214 may be initialized to default values. The in-band interface 214 may return to an available state by the reset operation even though the in-band interface 214 was previously in a failure state or in an error state. If (when) the reset operation is completed, the storage device 200 transmits a reset complete response.

In operation S270, the storage device 200 waits to receive a dump data transmission request from the host 100. If the dump data transmission request is not received from the host 100 in operation S270 (No), the procedure returns to operation S270 and the storage device 200 continuously waits to receive the dump data transmission request. If the dump data transmission request is received from the host 100 in operation S270 (Yes), the procedure proceeds to operation S280.

In operation S280, the storage device 200 transmits the dump data stored in the dump area 225 or 235 to the host 100 by using the in-band interface 214.

As described, in embodiments of the inventive concepts the dump request is received by the storage device 200 through the side-band interface 211, and the dump data is transmitted from the storage device 200 to the host 100 by using the in-band interface 214. Thus, according to the debugging methods of the inventive concepts, even though the capacity of dump data is great, it is possible to obtain the dump data at high speed. Also, according to embodiments of inventive concepts, a large amount of dump data may be quickly extracted by the storage device 200 without losing failure information and may be transmitted to a distant debugging host. Accordingly, the storage device 200 of the inventive concepts may be managed through remote diagnosis or remote debugging.

Figure 7:
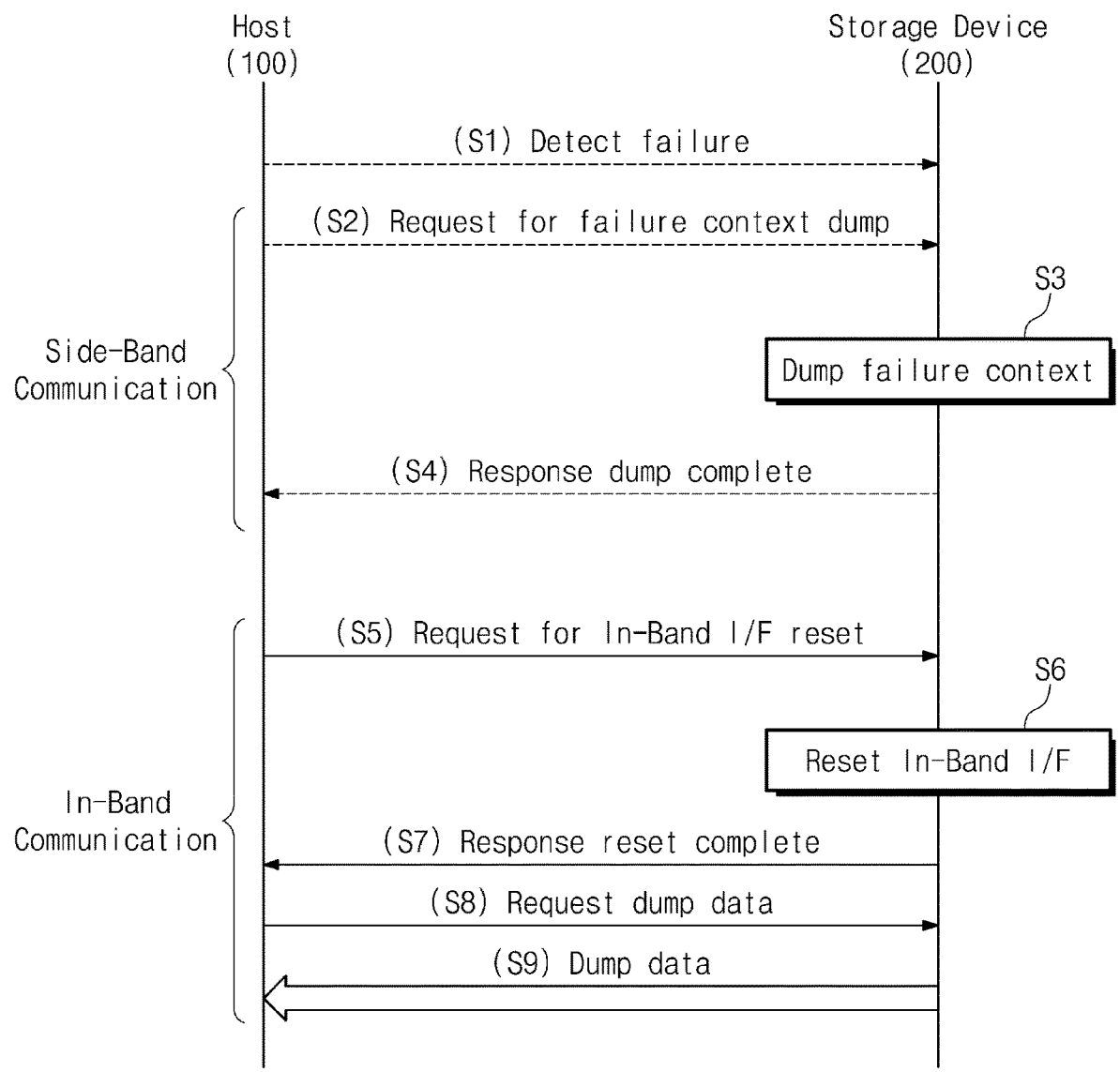
FIG. 7 illustrates a view of operations of the host and the storage device at occurrence of a failure event, described with reference to FIGS. 5 and 6.

FIG. 7 illustrates a diagram of failure management operations of a host and a storage device described with reference to FIGS. 5 and 6. Referring to FIG. 7, the dump request may be transmitted through the side-band interface 211, and dump data may be transmitted to the host 100 through the in-band interface 214.

In operation S1, an internal failure or error of the storage device 200 is detected. For example, the host 100 may monitor whether a failure or error event occurs, through the side-band interface 211. The host 100 may detect a failure or error in transaction with the storage device 200 through various failure detection operations.

In operation S2, the host 100 transmits the dump request to the storage device 200 in correspondence with the detected failure or error. When the failure occurs, the storage device 200 receives the dump request of dump data for debugging through the side-band channel 300 from the host 100.

In operation S3, the storage device 200 stores dump data or a failure context for preserving a failure occurrence state in response to the dump request. The storage device 200 extracts the dump data and stores the extracted dump data in the dump area 225 of the buffer memory 220 or the dump area 235 of the nonvolatile memory device 230. In particular, data which are capable of being lost upon subsequent resetting of the in-band interface 214, from among pieces of state data of the storage device 200 of or corresponding to a point in time when the failure or error occurs, may be first stored (i.e., first dump data).

In operation S4, the storage device 200 notifies the host 100 that the dump data are completely stored. If the dump data are completely stored, the storage device 200 transmits information indicating that the dump data are completely stored, to the host 100 through the side-band interface 300.

In operation S5, the host 100 transmits a reset request for the in-band interface 214 to the storage device 200. In the case where the detected failure or error arises from the in-band interface 214, a reset operation may be first of all performed to allow the in-band interface 214 to return to a reuse-possible state. The reset request for the in-band interface 214 may be transmitted by using a control signal provided through a separate pin or by using a command of a lower level. Accordingly, resetting the in-band interface 214 may make it possible to transmit dump data by using the in-band interface 214.

In operation S6, the storage device 200 performs the reset operation on the in-band interface 214. An operation state of the in-band interface 214 may be initialized by the reset operation. Register values or setting values of the in-band interface 214 may be initialized to default values.

In operation S7, the storage device 200 transmits a reset complete response associated with the in-band interface 214 to the host 100. The above-described procedure refers to a procedure of notifying the host 100 that high-speed data transmission through the in-band interface 214 is possible.

In operation S8, the host 100 transmits a read request for dump data stored in the dump area 225 or 235 to the storage device 200. In this case, the read request for dump data may be transmitted by using the in-band interface 214.

In operation S9, the storage device 200 transmits the dump data to the host 100 through the in-band interface 214. Even though the size of dump data is large, it may be possible to transmit the dump data at high speed because the in-band interface 214 is used.

Here, the communication between the host 100 and the storage device 200 performed in operation S1 to operation S4 may be performed through the side-band interface 211. The reason is that the detected failure or error comes from the in-band interface 214. The communication between the host 100 and the storage device 200 performed in operation S5 to operation S9 may be performed through the in-band interface 214. The reason is that the in-band interface 214 is again available as the in-band interface 214 is reset after all dump data are stored.

Figure 8:
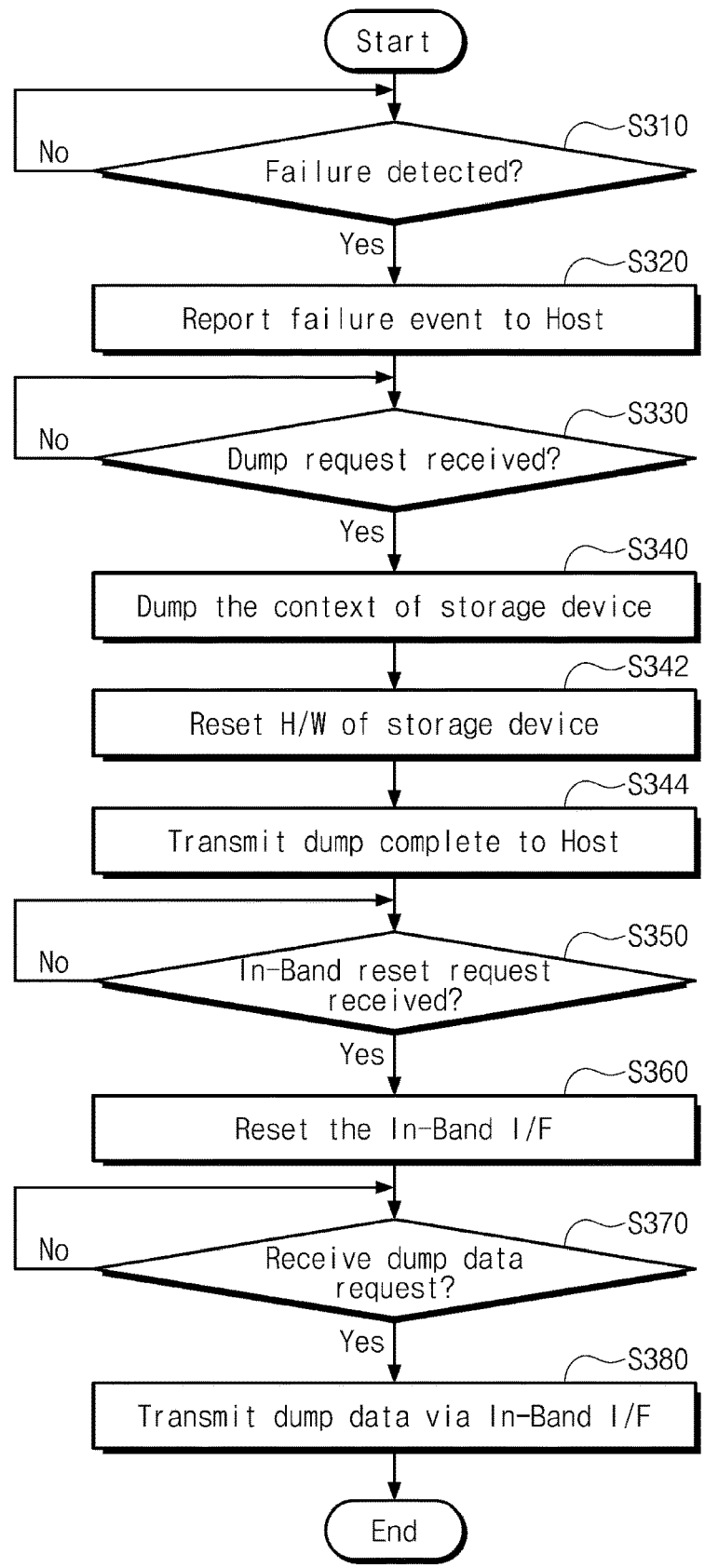
FIG. 8 illustrates a flowchart of a dump data management method of the storage device according to another embodiment of the inventive concepts.

FIG. 8 illustrates a flowchart of a dump data management method of a storage device according to another embodiment of the inventive concepts. Referring to FIG. 8, the storage device 200 receives the dump request through the side-band interface 211 and transmits dump data to the host 100 through the in-band interface 214. In addition, if the dump data are completely stored, the storage device 200 transmits a dump complete response to the host 100 after resetting a part or all of pieces of hardware of the storage device 200. In other words, after the dump data are completely stored by the storage device 200, the storage controller 210 resets at least one of a plurality of components of the storage device 200.

In operation S310, the storage device 200 detects whether an error or failure has occurred in the storage device 200. The storage device 200 may detect a failure of hardware as well as an operation of firmware or an error of software such as a response delay of interfaces. If the failure is not detected in operation S310 (No), the procedure returns to operation S310 and the storage device 200 continues to monitor a failure. If the failure is detected in operation S310 (Yes), the procedure proceeds to operation S320.

In operation S320, the storage device 200 reports that a failure or error event has occurred to the host 100 through the side-band interface 211. The host 100 may transmits the dump request to the storage device 200 through the side-band interface 211 in response to the report of the failure event.

In operation S330, the storage device 200 determines whether the dump request has been received from the host 100 through the side-band interface 211. If the dump request is not been received from the host 100 in operation S330 (No), the procedure returns to operation S330 and the storage device 200 waits for transmission of the dump request. In contrast, if the dump request is received from the host 100 in operation S330 (Yes), the storage device 200 recognizes the dump request. Afterwards, the procedure proceeds to operation S340.

In operation S340, the dump store module 215 (refer to FIG. 2) as executed by central processing unit 212 extracts dump data in response to the dump request transmitted through the side-band interface 211. The dump store module 215 may collect overall data directing an operation state of the storage device 200 of or corresponding to a point in time when the failure or error occurs, in response to the dump request. In particular, state information of firmware for processing a command from the host 100 or register information of the interfaces 211, 214, and 218 may be collected, and the collected information may be stored as dump data. Register information of the interfaces 211, 214, and 218 refers to state data capable of being lost upon resetting a part of pieces of hardware of the storage device 200. Accordingly, the state data capable of being lost may be the first of all data extracted upon generating dump data. In addition, pieces of data not lost in the reset process may also be included in the dump data. For example, the storage device 200 may include various kinds of user data or metadata such as address mapping information in the dump data. The dump data may be stored in the dump area 225 of the buffer memory 220 or the dump area 235 of the nonvolatile memory device 230.

In operation S342, the storage device 200 performs a reset operation on a part or all of components (i.e., at least one of a plurality of components) included in the storage device 200. The detected error or failure may not be an error or failure arising from the in-band interface 214. That is, to enable transmission of dump data to the host 100, hardware or firmware of the storage device 200 may be reset. In operation S342, the resetting of the in-band interface 214 may be skipped.

In operation S344, the storage device 200 notifies the host 100 that the dump data are completely stored. If the dump data are completely stored, the storage device 200 transmits information indicating that the dump data are completely stored, to the host 100.

In operation S350, the storage device 200 determines whether a reset request for the in-band interface 214 is received from the host 100. For example, the reset request for the in-band interface 214 provided from the host 100 may be detected by the dump transmission module 217. The reset request for the in-band interface 214 may be transmitted through the in-band interface 214. If the reset request for the in-band interface 214 is not yet received in operation S350 (No), the procedure returns to operation S350 and the storage device 200 continuously waits for transmission of the reset request. In contrast, if the reset request of the in-band interface 214 is received in operation S350 (Yes), the process proceeds to operation S360.

In operation S360, the storage device 200 resets the in-band interface 214 depending on the reset request transmitted from the host 100. After the reset operation is performed, setting parameters of the in-band interface 214 may be initialized to default values. The in-band interface 214 may return to an available state by the reset operation even though the in-band interface 214 was previously in a failure state or in an error state. If (when) the reset operation is completed, the storage device 200 transmits a reset complete response.

In operation S370, the storage device 200 waits for a dump data transmission request from the host 100. If the dump data transmission request is not received from the host 100 in operation S370 (No), the procedure returns to operation S370 and the storage device 200 continuously waits for the dump data transmission request. If the dump data transmission request is received from the host 100 in operation S370 (Yes), the procedure proceeds to operation S380.

In operation S380, the storage device 200 transmits the dump data stored in the dump area 225 or 235 to the host 100 by using the in-band interface 225.

As described, the dump request is received by the storage device 200 through the side-band interface 211, and the dump data is transmitted from the storage device 200 to the host 100 by using the in-band interface 214. The storage device 200 may reset some components of the storage device 200 before the reset request for the in-band interface 214 is received and immediately after dump data are completely stored. The probability that dump data are successfully transmitted may become higher through execution of resetting of components of the storage device 200.

Figure 9:
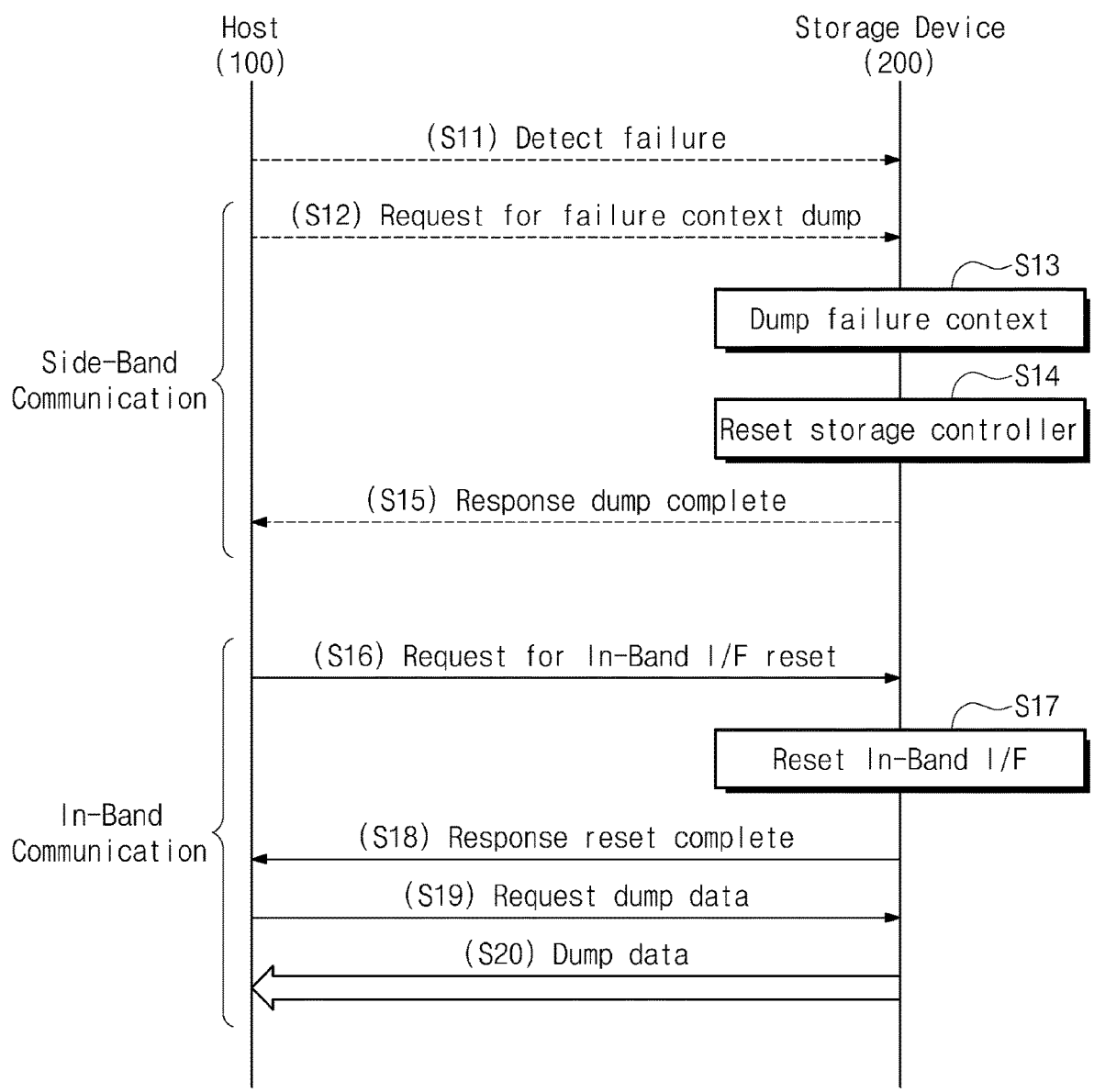
FIG. 9 illustrates a view of operations of the storage device and the host of FIG. 8.

FIG. 9 illustrates a view of interaction between a storage device and a host of FIG. 8. Referring to FIG. 9, if a dump request is transmitted through the side-band interface 211, the storage device 200 performs a reset operation on a part of pieces of hardware after storing dump data.

In operation S11, a failure or error is detected by the storage device 200 or the host 100. When the failure of the storage device 200 is detected, the storage device 200 may provide the host 100 with information indicating that a failure or error event has occurred, through the side-band interface 211. Alternatively, whether the error or failure event occurs may be detected by monitoring of the host 100.

In operation S12, the host 100 transmits the dump request to the storage device 200 in response to the failure or error event. In this case, the storage device 200 receives the dump request of dump data for debugging through the side-band channel 300.

In operation S13, the storage device 200 stores dump data or a failure context for preserving a failure state in response to the dump request. The storage device 200 extracts the dump data and stores the extracted dump data in the dump area 225 of the buffer memory 220 or the dump area 235 of the nonvolatile memory device 230.

In operation S14, the storage device 200 resets a part or all of components of the storage device 200 after storing the dump data. Through the reset operation, restoration to an available state may be made from the failure or error arising from the storage device 200.

In operation S15, the storage device 200 notifies the host 100 that the dump data are completely stored. If the dump data are completely stored, the storage device 200 transmits information indicating that the dump data are completely stored, to the host 100 through the side-band interface 300.

In operation S16, the host 100 transmits a reset request for the in-band interface 214 to the storage device 200. In the case where the detected failure or error arises from the in-band interface 214, a reset operation may be first of all performed to allow the in-band interface 214 to return to a reuse-possible state. The reset request for the in-band interface 214 may be transmitted by using a control signal provided through a separate pin. Accordingly, the reset request for the in-band interface 214 may be transmitted through the in-band interface 214.

In operation S17, the storage device 200 performs the reset operation on the in-band interface 214. An operation state of the in-band interface 214 may be initialized by the reset operation. Register values or setting values of the in-band interface 214 may be initialized to default values.

In operation S18, the storage device 200 transmits a reset complete response associated with the in-band interface 214 to the host 100. The above-described procedure refers to a procedure of notifying the host 100 that high-speed data transmission through the in-band interface 214 is possible.

In operation S19, the host 100 transmits a read request for dump data stored in the dump area 225 or 235 to the storage device 200. In this case, the read request for dump data may be transmitted by using the in-band interface 214.

In operation S20, the storage device 200 transmits the dump data to the host 100 through the in-band interface 214. Even though the size of dump data is large, it may be possible to transmit the dump data at high speed because the in-band interface 214 is used.

Here, the communication between the host 100 and the storage device 200 performed in operation S11 to operation S15 may be performed through the side-band interface 211. The communication between the host 100 and the storage device 200 performed in operation S16 to operation S20 may be performed through the in-band interface 214.

Figure 10:
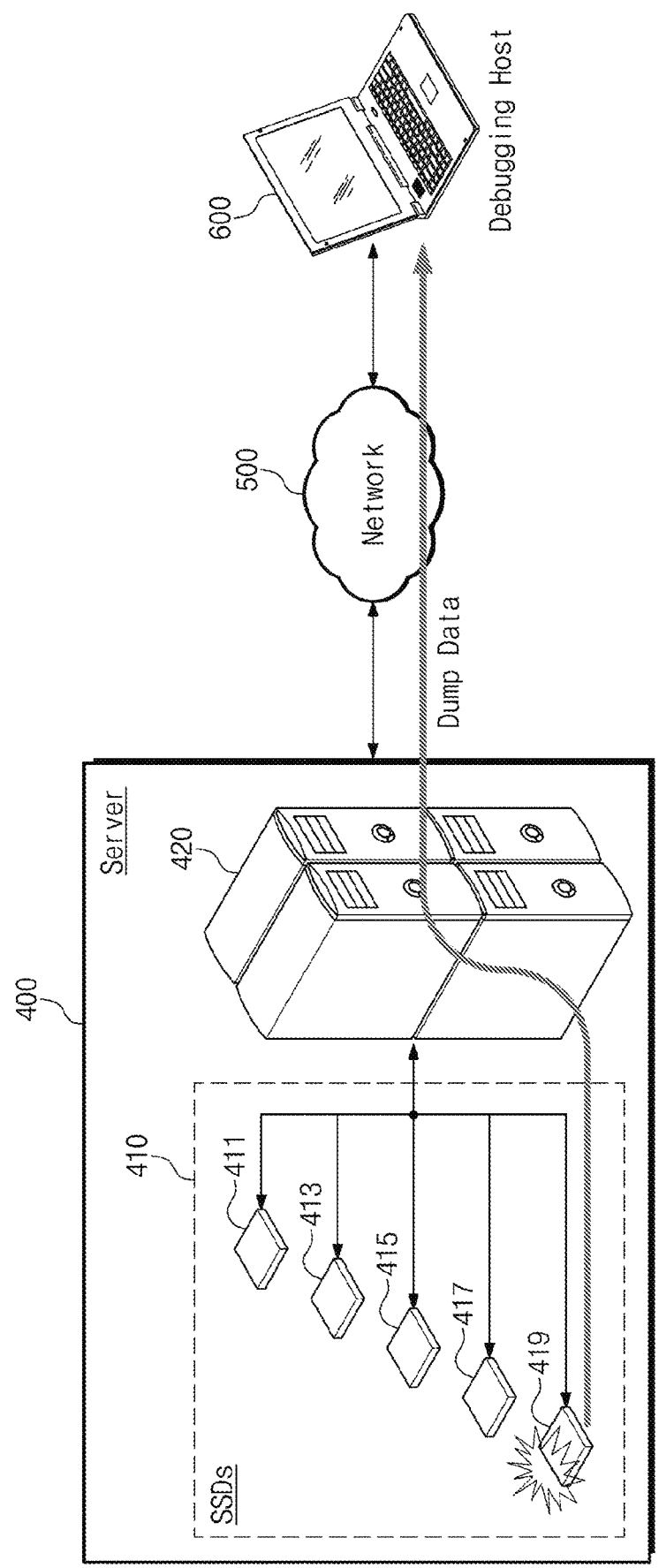
FIG. 10 illustrates a view of a server system according to an embodiment of the inventive concepts.

FIG. 10 illustrates a block diagram of a server system according to an embodiment of the inventive concepts. Referring to FIG. 10, a server system 400 may include storage 410 and a server host 420.

The storage 410 may be connected to the server host 420 to exchange data therewith. The storage 410 may include a plurality of solid state drives 411, 413, 415, 417, and 419. Each of the plurality of solid state drives 411, 413, 415, 417, and 419 may perform reporting of a failure to the server host 420 and transmitting of dump data to the server host 420 in the same manner as the storage device 200 of FIG. 1 described above. That is, each of the plurality of solid state drives 411, 413, 415, 417, and 419 may receive a dump request through a side-band interface. After resetting an in-band interface, each of the plurality of solid state drives 411, 413, 415, 417, and 419 may transmit stored dump data by using an in-band interface.

In an embodiment, the solid state drive 419 where an error or failure occurs may receive the dump request from the server host 420 through the side-band interface. The solid state drive 419 generates dump data by collecting and storing a failure context in response to the dump request. The solid state drive 419 may transmit the dump data to the server host 420 after resetting the in-band interface.

When receiving the dump data, the server host 420 transmits the dump data to a debugging host 600 over a network 500. Since the server host 420 receives the dump data of the solid state drive 419, the server host 420 may quickly transmit the dump data to the debugging host 600. In this case, the dump data may be quickly transmitted to the debugging host 600 remotely located over the network 500.

Figure 11:
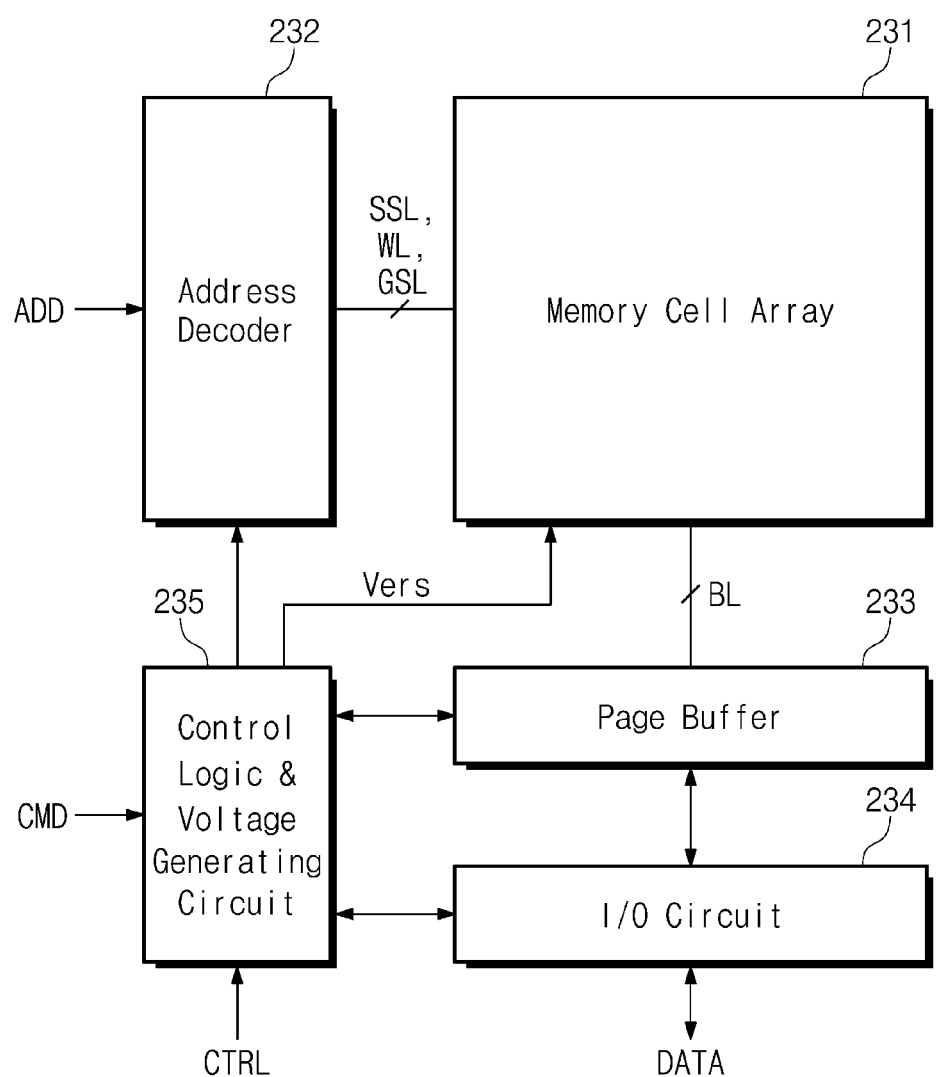
FIG. 11 illustrates a block diagram of a configuration of a nonvolatile memory device described in FIG. 1.

FIG. 11 illustrates a block diagram of a configuration of a nonvolatile memory described with reference to FIG. 1. Referring to FIG. 11, the nonvolatile memory device 230 includes a memory cell array 231, an address decoder 232, a control logic and voltage generating circuit 235, a page buffer 233, and an input/output circuit 234.

The memory cell array 231 may include a plurality of memory blocks. Each of the memory blocks may include a plurality of cell strings. Each of the cell strings may include a plurality of memory cells. The memory cells may be connected with a plurality of word lines WL. Each memory cell may be a single level cell (SLC) storing one bit or a multi-level cell (MLC) storing at least two bits.

The address decoder 232 is connected with the memory cell array 231 through the word lines WL, string selection lines SSL, and ground selection lines GSL. The address decoder 232 may receive and decode a physical address ADD from an external device (e.g., the storage controller 210) and may drive the word lines based on the decoding result. For example, the address decoder 232 may decode the physical address ADD received from the external device, may select at least one of the word lines WL based on the decoded physical address, and may drive the selected word line.

The control logic and voltage generating circuit 235 may control the address decoder 232, the page buffer 233, and the input/output circuit 234 in response to a storage command CMD and a control signal CTRL from the external device. For example, the control logic and voltage generating circuit 235 may control other components in response to the signals CMD and CTRL such that data are stored in the memory cell array 231. Alternatively, the control logic and voltage generating circuit 235 may control other components in response to the signals CMD and CTRL such that data stored in the memory cell array 231 are transmitted to the external device.

The page buffer 233 is connected to the memory cell array 231 through a plurality of bit lines BL. Under control of the control logic and voltage generating circuit 235, the page buffer 233 may control the bit lines BL such that data provided from the input/output circuit 234 are stored in the memory cell array 231. Under control of the control logic and voltage generating circuit 235, the page buffer 233 may read data stored in the memory cell array 231 and may provide the read data to the input/output circuit 234. For example, the page buffer 233 may be provided with data from the input/output circuit 234 by the page or may read data from the memory cell array 231 by the page.

The input/output circuit 234 may receive data DATA from the external device and may provide the received data to the page buffer 233. Alternatively, the input/output circuit 234 may receive data from the page buffer 233 and may transmit the received data to the external device as data DATA. For example, the input/output circuit 234 may exchange data with the external device in synchronization with the control signal CTRL.

The control logic and voltage generating circuit 235 may generate various voltages Vers required for the nonvolatile memory 230 to operate. For example, the control logic and voltage generating circuit 235 may generate a plurality of program voltages, a plurality of pass voltages, a plurality of verification voltages, a plurality of selection read voltages, a plurality of non-selection read voltages, a plurality of erase voltages, and the like. The control logic and voltage generating circuit 235 may provide the generated voltages to the address decoder 232 or to a substrate of the memory cell array 231.

Figure 12:
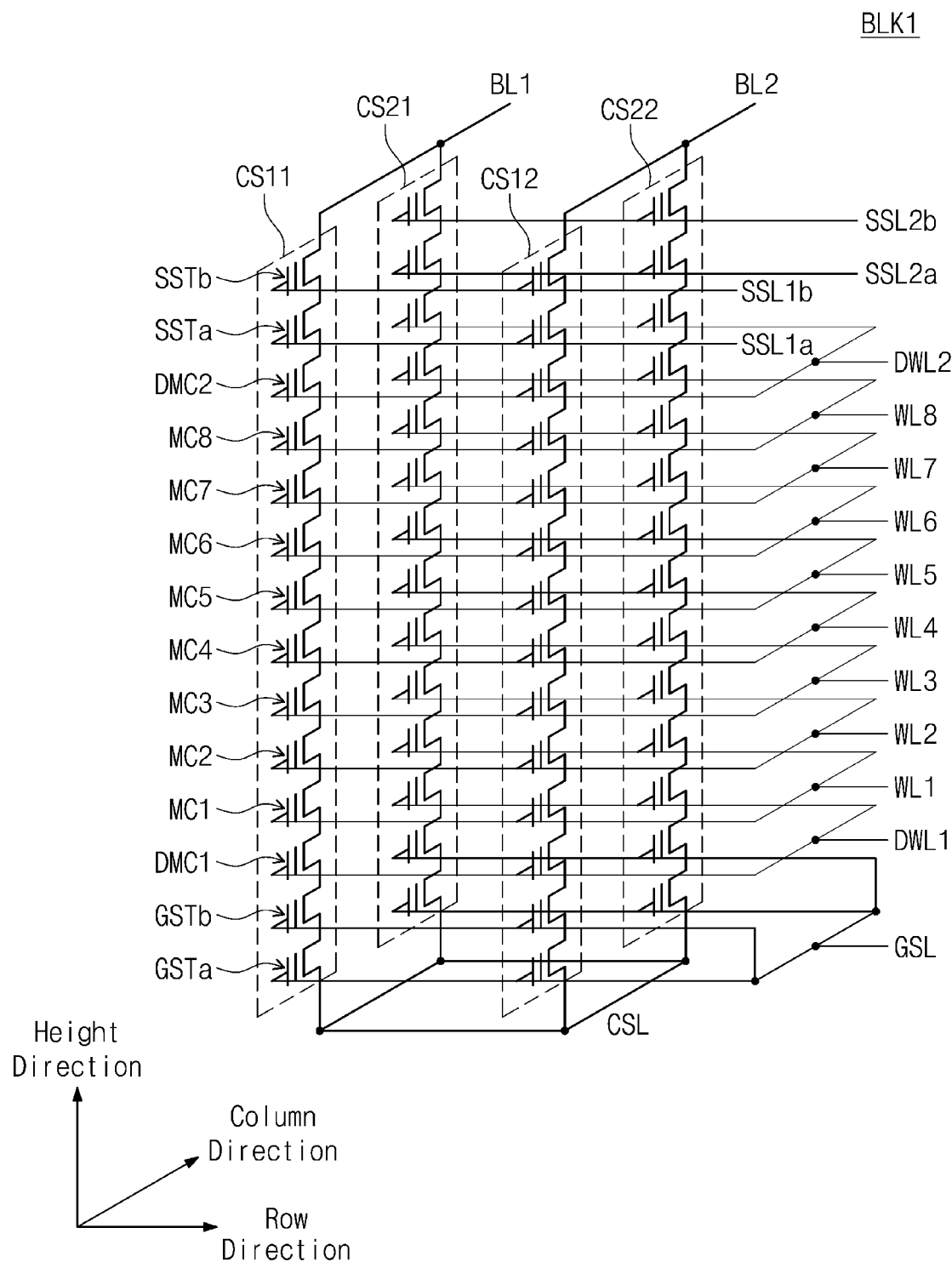
FIG. 12 illustrates a circuit diagram of an example of a first memory block of memory blocks included in a memory cell array of FIG. 11.

FIG. 12 illustrates a circuit diagram of an example of a first memory block of memory blocks included in a memory cell array in FIG. 11. In an embodiment, a first memory block BLK1 having a three-dimensional structure will be described with reference to FIG. 12. However, the inventive concepts are not be limited thereto, and other memory blocks included in the nonvolatile memory device 230 may have a structure which is similar to the first memory block BLK1.

Referring to FIG. 12, the first memory block BLK1 includes a plurality of cell strings CS11, CS12, CS21, and CS22. The cell strings CS11, CS12, CS21, and CS22 may be arranged along a row direction and a column direction to form rows and columns.

For example, the cell strings CS11 and CS12 may be connected to string selection lines SSL1a and SSL1b to constitute a first row. The cell strings CS21 and CS22 may be connected to string selection lines SSL2a and SSL2b to constitute a second row.

For example, the cell strings CS11 and CS21 may be connected to a first bit line BL1 to constitute a first column. The cell strings CS12 and CS22 may be connected to a second bit line BL2 to constitute a second column.

Each of the cell strings CS11, CS12, CS21, and CS22 may include a plurality of cell transistors. For example, each of the cell strings CS11, CS12, CS21, and CS22 may include string selection transistors SSTa and SSTb, a plurality of memory cells MC1 to MC8, ground selection transistors GSTa and GSTb, and dummy memory cells DMC1 and DMC2.

In an embodiment, each of the memory cells included in the cell strings CS11, CS12, CS21, and CS22 may be a charge trap flash (CTF) memory cell.

The memory cells MC1 to MC8 may be serially connected and may be stacked in a height direction that is a direction perpendicular to a plane defined by the row direction and the column direction. The string selection transistors SSTa and SSTb may be serially connected and may be disposed between the memory cells MC1 to MC8 and a bit line BL. The ground selection transistors GSTa and GSTb may be serially connected and may be disposed between the memory cells MC1 to MC8 and a common source line CSL.

In an embodiment, in each cell string, a first dummy memory cell DMC1 may be provided between the memory cells MC1 to MC8 and the ground selection transistors GSTa and GSTb. In an embodiment, in each cell string, a second dummy memory cell DMC2 may be provided between the memory cells MC1 to MC8 and the string selection transistors SSTa and SSTb.

The ground selection transistors GSTa and GSTb of the cell strings CS11, CS12, CS21, and CS22 may be connected in common to a ground selection line GSL.

In an embodiment, ground selection transistors in the same row may be connected to the same ground selection line, and ground selection transistors in different rows may be connected to another ground selection line. For example, the first ground selection transistors GSTa of the cell strings CS11 and CS12 in the first row may be connected to a first ground selection line, and the first ground selection transistors GSTa of the cell strings CS21 and CS22 in the second row may be connected to a second ground selection line.

In an embodiment, even though not illustrated in FIG. 12, ground selection transistors provided at the same height from a substrate (not illustrated) may be connected to the same ground selection line, and ground selection transistors provided at different heights may be connected to different ground selection lines. For example, the first ground selection transistors GSTa of the cell strings CS11, CS12, CS21, and CS22 may be connected to the first ground selection line, and the second ground selection transistors GSTb thereof may be connected to the second ground selection line.

Memory cells placed at the same height from the substrate (or the ground selection transistors GSTa and GSTb) may be connected in common to the same word line, and memory cells placed at different heights therefrom may be connected to different word lines. For example, the first to eighth memory cells MC1 to MC8 in cell strings CS11, CS12, CS21, and CS22 may be respectively connected in common to the first to eighth word lines WL1 to WL8.

String selection transistors belonging to the same row among the first string selection transistors SSTa at the same height may be connected to the same string selection line, and string selection transistors belonging to different rows may be connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL2a.

Likewise, string selection transistors belonging to the same row among the second string selection transistors SSTb arranged at the same height may be connected to the same string selection line, and string selection transistors belonging to different rows among the second string selection transistors SSTb may be connected to different string selection lines. For example, the second string selection transistors SSTb of the cell strings CS11 and CS12 in the first row may be connected in common to the string selection line SSL1b, and the second string selection transistors SSTb of the cell strings CS21 and CS22 in the second row may be connected in common to the string selection line SSL2b.

Even though not illustrated in FIG. 12, string selection transistors of cell strings in the same row may be connected in common to the same string selection line. For example, the first and second string selection transistors SSTa and SSTb of the cell strings CS11 and CS12 in the first row may be connected in common to the same string selection line. The first and second string selection transistors SSTa and SSTb of the cell strings CS21 and CS22 in the second row may be connected in common to the same string selection line.

In an embodiment, dummy memory cells at the same height may be connected with the same dummy word line, and dummy memory cells at different heights may be connected with different dummy word lines. For example, the first dummy memory cells DMC1 may be connected with the first dummy word line DWL1, and the second dummy memory cells DMC2 may be connected with the second dummy word line DWL2.

In the first memory block BLK1, read and write operations may be performed in units of rows. For example, one row of the first memory block BLK1 may be selected by the string selection lines SSL1a, SSL1b, SSL2a, and SSL2b.

For example, the cell strings CS11 and CS12 in the first row are respectively connected to the bit lines BL1 and BL2 when a turn-on voltage is supplied to the string selection lines SSL1a and SSL1b and a turn-off voltage is supplied to the string selection lines SSL2a and SSL2b. The cell strings CS21 and CS22 in the second row are respectively connected to the bit lines BL1 and BL2 when the turn-on voltage is supplied to the string selection lines SSL2a and SSL2b and the turn-off voltage is supplied to the string selection lines SSL1a and SSL1b. As a word line is driven, memory cells belonging to the same height among memory cells of cell strings in a row corresponding to the driven word line may be selected. A read or write operation may be performed on the selected memory cells. The selected memory cells may constitute a physical page unit.

In the first memory block BLK1, memory cells may be erased in units of a memory block or a sub-block. When an erase operation is performed in units of memory blocks, all memory cells in the memory block BLK1 may be simultaneously erased according to an erase request. When the erase operation is performed in units of sub-blocks, a part of the memory cells in the memory block BLK1 may be simultaneously erased according to an erase request, and the remaining memory cells thereof may be erase-inhibited. A low voltage (e.g., a ground voltage) may be supplied to a word line connected to memory cells to be erased, and a word line connected to erase-inhibited memory cells may be floated.

The first memory block BLK1 illustrated in FIG. 12 is exemplary. The number of cell strings may increase or decrease, and the number of rows of cell strings and the number of columns of cell strings may increase or decrease depending on the number of cell strings. In the first memory block BLK1, also, the number of transistors (GST, MC, DMC, SST, or the like) may increase or decrease, and a height of the first memory block BLK1 may increase or decrease depending on the number of the transistors. Also, the number of lines (GSL, WL, DWL, SSL, etc.) connected with transistors may increase or decrease depending on the number of the transistors.

Figure 13:
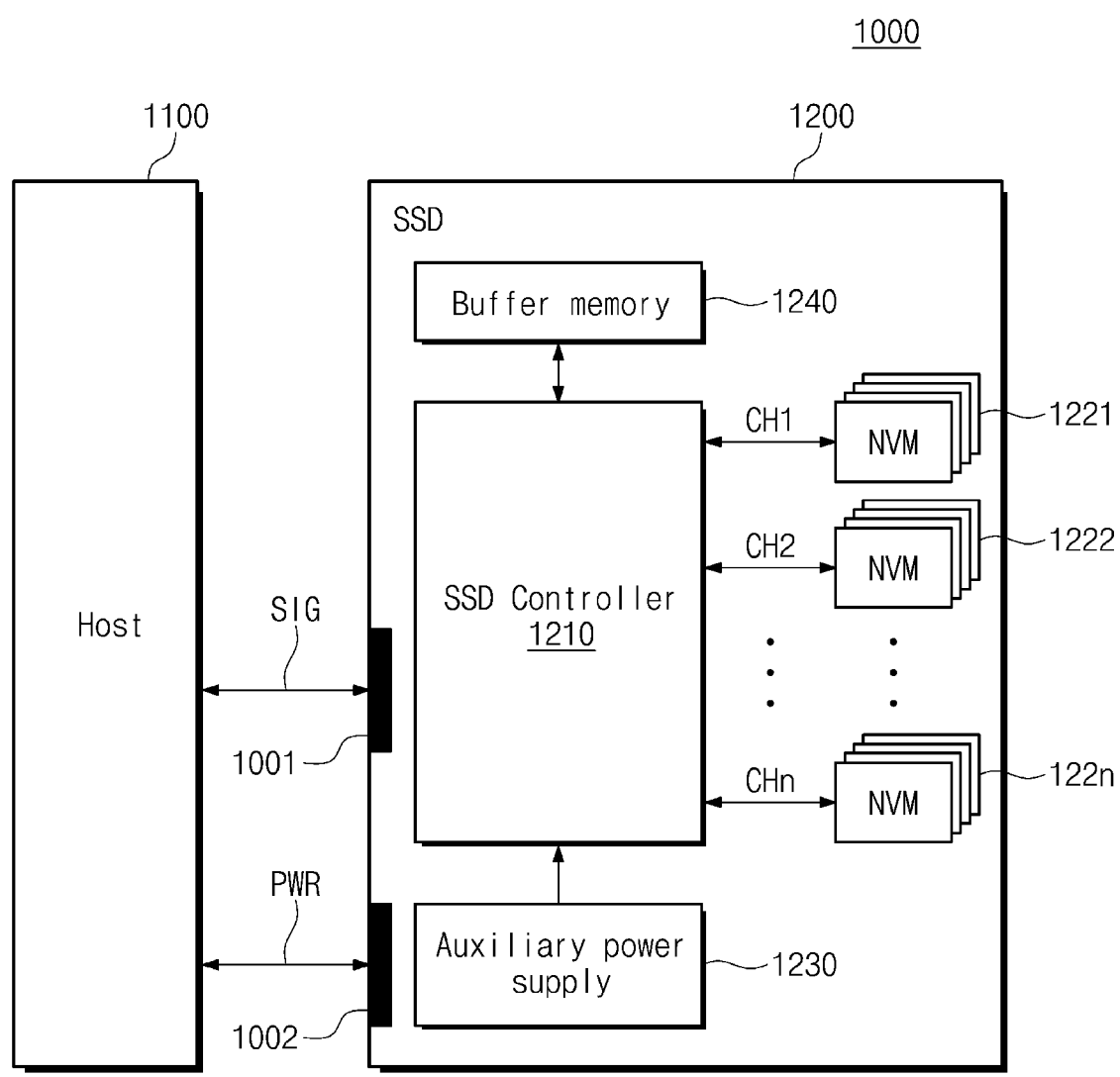
FIG. 13 illustrates a block diagram of a solid state drive system to which a debugging method according to the inventive concepts is applied.

FIG. 13 illustrates a block diagram of a solid state drive system to which a storage device according to the inventive concepts is applied. Referring to FIG. 13, an SSD system 1000 includes a host 1100 and an SSD 1200. The SSD 1200 exchanges signals SIG with the host 1100 through a signal connector 1001 and is supplied with power PWR through a power connector 1002. The SSD 1200 may include an SSD controller 1210, a plurality of flash memories 1221 to 122n, an auxiliary power supply 1230, and a buffer memory 1240.

The SSD controller 1210 may control the flash memories 1221 to 122n through respective channels CH1 to CHn in response to the signal SIG from the host 1100. In an embodiment, the SSD controller 1210 may generate and transmit dump data to the host 1100, based on components described with reference to FIG. 2. When a failure or error occurs, the SSD controller 1210 may report a failure event to the host 1100 by using a side-band interface and may receive a dump request by using the side-band interface. If the dump data are completely stored, the SSD controller 1210 resets an in-band interface and transmits the dump data to the host 1100 by using the reset in-band interface.

The auxiliary power supply 1230 is connected with the host 1100 through the power connector 1002. The auxiliary power supply 1230 may be charged by the power PWR from the host 1100. When power is not smoothly supplied from the host 1100, the auxiliary power supply 1230 may power the SSD system 1000. The auxiliary power supply 1230 may be placed inside or outside the SSD 1200. For example, the auxiliary power supply 1230 may be situated on a main board to supply auxiliary power to the SSD 1200.

The buffer memory 1240 operates as a buffer memory of the SSD 1200. For example, the buffer memory 1240 may temporarily store data received from the host 1100 or from the flash memories 1221 to 122*n*, or may temporarily store metadata (e.g., a mapping table) of the flash memories 1221 to 122*n*. The buffer memory 1240 may include volatile memory such as for example dynamic RAM (DRAM), synchronous DRAM (SDRAM), double date rate (DDR) SDRAM, low power double data rate (LPDDR) SDRAM, static RAM (SRAM) or the like, or nonvolatile memory such as for example ferroelectric RAM (FRAM), resistive RAM (ReRAM), spin transfer torque-magnetoresistive RAM (STT-MRAM), phase change RAM (PRAM) or the like.

Figure 14:
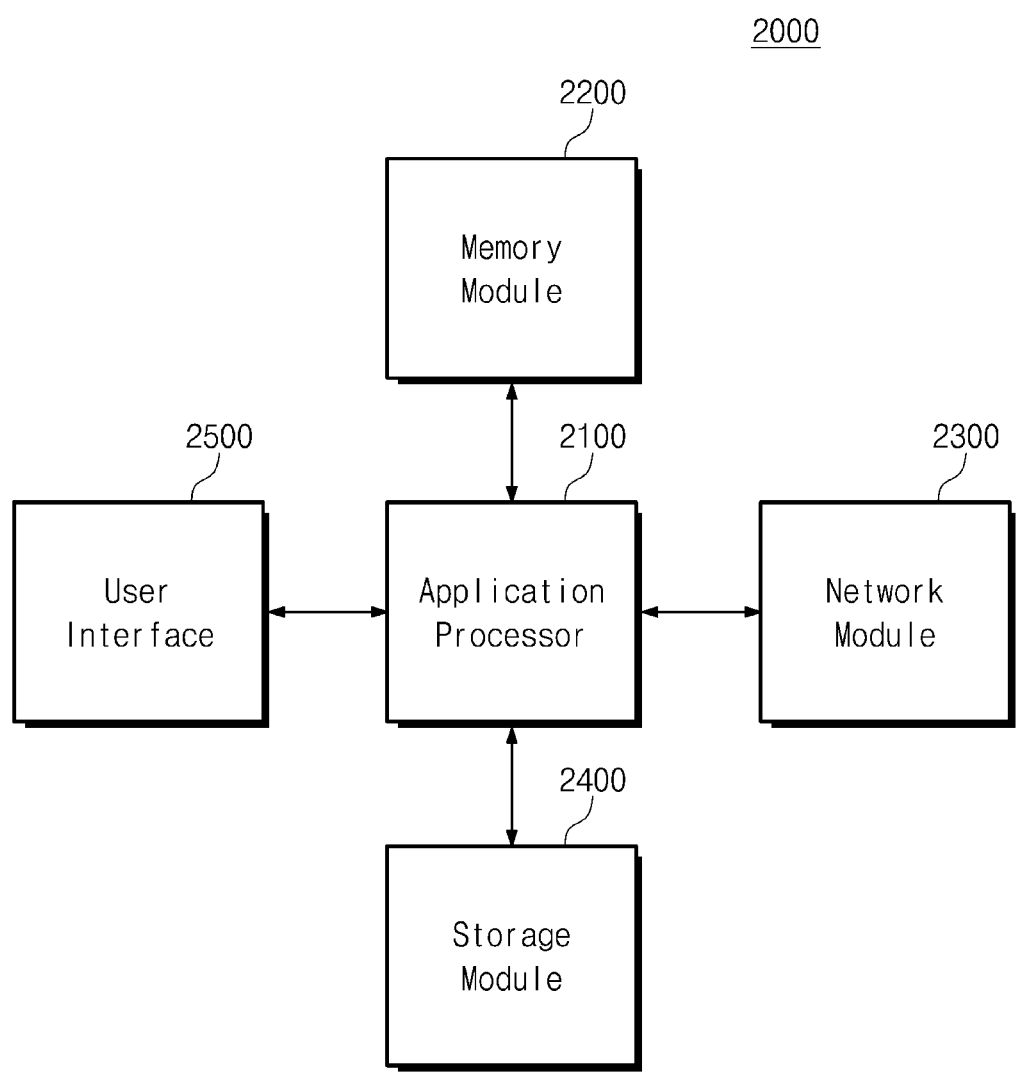
FIG. 14 illustrates a block diagram of a user system including the storage device according to an embodiment of the inventive concepts.

FIG. 14 illustrates a block diagram of a user system including a storage device according to an embodiment of the inventive concepts. Referring to FIG. 14, a user system 2000 may include an application processor 2100, a memory module 2200, a network module 2300, a storage module 2400, and a user interface 2500.

The application processor 2100 may drive components and an operating system that are included in the user system 2000. In an embodiment, the application processor 2100 may include controllers for controlling components of the user system 2000, graphics engines, a variety of interfaces, and the like. The application processor 2100 may be implemented with a system-on-chip (SoC).

The memory module 2200 may operate as a main memory, a working memory, a buffer memory, or a cache memory of the user system 2000. The memory module 2200 may include volatile random access memory such as for example DRAM, SDRAM, double date rate (DDR) SDRAM, DDR2 SDRAM, DDR3 SDRAM, LPDDR SDRAM, LPDDR3 SDRAM or the like, or nonvolatile random access memory such as for example phase-change RAM (PRAM), magnetic RAM (MRAM), resistive RAM (RRAM), ferroelectric RAM (FRAM) or the like.

The network module 2300 may communicate with external devices. For example, the network module 2300 may support wireless communications such as code division multiple access (CDMA), global system for mobile communication (GSM), wideband CDMA (WCDMA), CDMA-2000, time division multiple access (TDMA), long term evolution (LTE™), Wimax, WLAN, UWB, Bluetooth, WI-DI, and the like. In an embodiment, the network module 2300 may be included in the application processor 2100.

The storage module 2400 may store data. For example, the storage module 2400 may store data received from the application processor 2100. Alternatively, the storage module 2400 may transmit data stored therein to the application processor 2100. For example, the storage module 2400 may include a semiconductor memory device including for example PRAM, MRAM, RRAM, NAND flash memory, NOR flash memory, or three-dimensional NAND flash memory.

The storage module 2400 may include a nonvolatile memory device and a storage controller therein. The storage module 2400 may communicate with the application processor 2100 through an in-band interface and a side-band interface. When a failure occurs, the storage module 2400 receives a dump request by using the side-band interface. If dump data are completely stored, the storage module 2400 resets the in-band interface. The storage module 2400 may transmit the dump data to the application processor 2100 or a debugging device by using the reset in-band interface.

The user interface 2500 may include interfaces which input data or commands to the application processor 2100 or output data to an external device. The user interface 2500 may include user input interfaces such as for example a keyboard, a keypad, buttons, a touch panel, a touch screen, a touch pad, a touch ball, a camera, a microphone, a gyroscope sensor, a vibration sensor, and the like. The user interface 2500 may further include user output interfaces such as for example a liquid crystal display (LCD), an organic light-emitting diode (OLED) display device, an active matrix OLED (AMOLED) display device, a light-emitting diode (LED), a speaker, a motor, and the like.

According to embodiments of the inventive concepts, it may be possible to obtain dump data, which are generated when a failure or error of a storage device occurs, at high speed. In addition, the storage device of the inventive concepts may generate dump data for debugging without losing state data of an interface of or corresponding to a point in time when a failure or error occurs. Accordingly, the storage device of the inventive concepts may enable highly reliable debugging and may markedly reduce the cost of debugging.

While the inventive concepts have been described with reference to exemplary embodiments thereof, it will be apparent to those of ordinary skill in the art that various changes and modifications may be made thereto without departing from the spirit and scope of the inventive concepts as set forth in the following claims.

What is claimed is:

1. A storage device comprising:
a memory device comprising a dump area; and
a storage controller configured to
  receive a dump request from a host through a first host interface at an occurrence of an error,
  generate dump data including state information of the storage device for debugging, responsive to the dump request,
  store the dump data in the dump area, and
  transmit the stored dump data to the host using a second host interface after resetting the second host interface,
wherein the first host interface comprises a side-band interface and the second host interface comprises an in-band interface,
wherein the dump data comprises first dump data and second dump data, the first dump data comprising data that would be lost upon resetting the second host interface, and the second dump data comprising data that would not be lost upon resetting the second host interface, and
wherein the first dump data and the second dump data are stored in separate areas of the dump area.

2. The storage device of claim 1, wherein the storage controller is further configured to reset at least one of a plurality of components of the storage device after storing the dump data in the dump area.

3. The storage device of claim 1, wherein the storage controller is configured to transmit a complete response to the host using the first host interface after storing the dump data in the dump area.

4. The storage device of claim 1, wherein the storage controller is configured to receive a reset request for resetting the second host interface from the host using the second host interface.

5. The storage device of claim 1, wherein the storage controller comprises:
a working memory configured to load a dump store module and a dump transmission module, the dump store module configured for collecting the dump data in response to the dump request and storing the collected dump data in the dump area as the stored dump data, and the dump transmission module configured for transmitting the stored dump data to the host using the second host interface; and
a central processing unit configured to execute the dump store module and the dump transmission module.

6. The storage device of claim 5, wherein the central processing unit is configured to transmit the stored dump data to the host after resetting the second host interface by execution of the dump transmission module.

7. The storage device of claim 1, wherein the first host interface comprises at least one of an I²C interface, a system management bus (SMBus) interface, a universal asynchronous receiver transmitter (UART) interface, a serial peripheral interface (SPI), or a high-speed inter-chip (HSIC) interface.

8. The storage device of claim 1, wherein the second host interface comprises at least one of a serial AT attachment (SATA) interface, a serial attached SCSI (SAS), a peripheral component interconnection (PCI) interface, a PCI express (PCIe) interface, a nonvolatile memory express (NVMe) interface, a universal flash storage (UFS) interface, or an embedded MMC (eMMC) interface.

9. The storage device of claim 1, wherein the memory device comprises a buffer memory and a nonvolatile memory device, and
wherein the dump data is stored in the buffer memory or the nonvolatile memory device.

10. A debugging method for a storage device which communicates with a host through a side-band interface and an in-band interface, the debugging method comprising:
receiving, by the storage device, a dump request from the host through the side-band interface at an occurrence of an error;
generating, by the storage device, dump data including state information of the storage device for debugging in response to the dump request;
storing, by the storage device, the dump data in a memory device;
receiving, by the storage device, a reset request for resetting the in-band interface from the host;
resetting, by the storage device, the in-band interface responsive to the reset request; and
after the in-band interface is completely reset, transmitting, by the storage device, the stored dump data to the host through the in-band interface.

11. The debugging method of claim 10, wherein the dump data comprises first dump data and second dump data, the first dump data comprising data that would be lost during the resetting, and the second dump data comprising data that would not be lost during the resetting, and
wherein the storing of the dump data comprises the storage device first storing the first dump data in the memory device.

12. The debugging method of claim 10, further comprising:
resetting at least one of a central processing unit, a working memory, and the memory device included in the storage device, after the storing of the dump data in the memory device.

13. The debugging method of claim 10, wherein the reset request is received as a command or a control signal of the in-band interface.

14. A computing system comprising:
a storage device comprising a first host interface and a second host interface, the storage device configured to collect dump data including state information of the storage device for debugging, and store the dump data in response to a dump request at an occurrence of an error; and
a host configured to
transmit the dump request to the storage device using the first host interface, and
read the stored dump data using the second host interface, after the second host interface is reset responsive to a reset request for the second host interface,
wherein the storage device resets at least one of a plurality of components of the storage device before receiving the reset request for the second host interface.

15. The computing system of claim 14, wherein the dump data includes first state information of the second host interface, and the storage device is configured to first store the first state information as the dump data before the second host interface is reset.

16. The computing system of claim 14, wherein the storage device further comprises a nonvolatile memory device configured to store the dump data.

17. The computing system of claim 14, wherein the host is configured to transmit the reset request to the storage device as a control signal to the second host interface.

18. The computing system of claim 14, wherein the host is configured to transmit the read dump data to a remote debugging host over a network.

* * * * *